(12) United States Patent
Usui

(10) Patent No.: US 10,509,470 B2
(45) Date of Patent: Dec. 17, 2019

(54) VIBRATING DEVICE

(71) Applicant: Murata Manufacturing Co., Ltd., Nagaokakyo-shi, Kyoto-fu (JP)

(72) Inventor: Kentaro Usui, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 15/365,006

(22) Filed: Nov. 30, 2016

(65) Prior Publication Data
US 2017/0083098 A1    Mar. 23, 2017

Related U.S. Application Data

(63) Continuation of application No. PCT/JP2015/066141, filed on Jun. 4, 2015.

(30) Foreign Application Priority Data

Jun. 6, 2014 (JP) .................. 2014-117784

(51) Int. Cl.
| | |
|---|---|
| *G06F 3/01* | (2006.01) |
| *G06F 3/041* | (2006.01) |
| *G06F 3/044* | (2006.01) |
| *G06F 3/0488* | (2013.01) |
| *G06F 1/16* | (2006.01) |

(52) U.S. Cl.
CPC ............ *G06F 3/016* (2013.01); *G06F 1/1626* (2013.01); *G06F 1/1643* (2013.01);
(Continued)

(58) Field of Classification Search
CPC . G06F 3/01; G06F 3/016; G06F 3/041; G06F 3/0412; G06F 3/0414;
(Continued)

(56) References Cited

U.S. PATENT DOCUMENTS 5,856,956 A * 1/1999 Toki .................. B06B 1/0603
310/324
9,332,353 B2   5/2016 Ando
(Continued)

FOREIGN PATENT DOCUMENTS

JP       2005-303937 A    10/2005
JP    WO 2013129101 A1 *  9/2013 ........... G06F 1/1633
(Continued)

OTHER PUBLICATIONS

English Language Machine Translation of WO-2013 / 129101 A1.*
(Continued)

*Primary Examiner* — Jason M Mandeville
(74) *Attorney, Agent, or Firm* — Arent Fox LLP

(57) ABSTRACT

A vibrating device that includes a pair of vibrators, a vibrating body that includes a conductor, a touch panel sensor that includes touch sensors, and a printed circuit board on which a drive circuit is formed. The touch panel sensor is attached to one principal surface of the vibrating body. Moreover, both ends of the vibrating body on the other principal surface of the vibrating body are fixed to the pair of vibrators. The vibrating body is a conductor that is arranged between the touch sensors and the drive circuit. The conductor is connected to a reference potential of each touch sensor and the printed circuit board is positioned between the two vibrators.

16 Claims, 19 Drawing Sheets

(52) U.S. Cl.
CPC ............ *G06F 1/1688* (2013.01); *G06F 3/041* (2013.01); *G06F 3/044* (2013.01); *G06F 3/0412* (2013.01); *G06F 3/0416* (2013.01); *G06F 3/0488* (2013.01); *G06F 2203/04102* (2013.01); *G06F 2203/04103* (2013.01); *G06F 2203/04111* (2013.01); *H04R 2499/15* (2013.01)

(58) Field of Classification Search
CPC ...... G06F 3/0416; G06F 3/044; G06F 3/0488; G06F 1/1688; G06F 1/1643; G06F 1/1626; G06F 2203/04103; G06F 2203/04111; G06F 2203/04102; H04R 2499/15; B06B 1/0644; B06B 1/0688; H01L 41/04; H01L 41/053; H01L 41/08; H01L 41/081; H01L 41/083
USPC ......................................................... 345/173
See application file for complete search history.

(56) References Cited

U.S. PATENT DOCUMENTS

| | | | |
|---|---|---|---|
| 9,363,607 | B2 | 6/2016 | Ando |
| 2010/0224437 | A1* | 9/2010 | Booth ..................... H04R 7/10 181/166 |
| 2010/0328053 | A1* | 12/2010 | Yeh ........................ G06F 3/016 340/407.2 |
| 2013/0108061 | A1* | 5/2013 | Ando ................... G06F 3/0433 381/55 |
| 2014/0079255 | A1 | 3/2014 | Ando |
| 2015/0062458 | A1 | 3/2015 | Nakamura et al. |
| 2015/0131822 | A1 | 5/2015 | Ando |
| 2015/0131823 | A1 | 5/2015 | Ando |
| 2015/0212571 | A1 | 7/2015 | Kitada |
| 2016/0313795 | A1* | 10/2016 | Muramatsu ......... H01L 41/0986 |

FOREIGN PATENT DOCUMENTS

| | | |
|---|---|---|
| WO | WO 2012/157691 A1 | 11/2012 |
| WO | WO 2013/146464 A1 | 12/2015 |
| WO | WO 2014/073440 A1 | 9/2016 |

OTHER PUBLICATIONS

International Search Report issued for PCT/JP2015/066141, dated Aug. 4, 2015.
Written Opinion of the International Searching Authority issued for PCT/JP2015/066141, dated Aug. 4, 2015.

* cited by examiner

VIBRATING DEVICE

CROSS REFERENCE TO RELATED APPLICATIONS

The present application is a continuation of PCT/JP2015/066141 filed Jun. 4, 2015, which claims priority to Japanese Patent Application No. 2014-117784, filed Jun. 6, 2014, the entire contents of each of which are incorporated herein by reference.

TECHNICAL FIELD

The present invention relates to a vibrating device that includes a vibrating body that vibrates when a drive signal is applied to a vibrator extending and contracting in a planar direction.

BACKGROUND

In recent years, a vibrating device which makes a user feel a "push" of a key by transmitting a vibration when the user touches the key on a touch panel keyboard has been proposed.

For example, Patent Document 1 discloses an electronic device which includes a touch panel sensor which detects a user's touch on a key, a piezoelectric bimorph element (piezoelectric body) which is made of piezoelectric ceramics, and vibration control means (drive circuit) which applies an alternating-current drive signal to the piezoelectric bimorph element. Both ends of the piezoelectric bimorph element are held by support members, and a vibrated body (diaphragm) is provided at a center of the piezoelectric bimorph element.

The electronic device of Patent Document 1 transmits a vibration to a user via the connected vibrated body (diaphragm) by applying an alternating-current drive signal to the piezoelectric bimorph element to vibrate. Thus, the electronic device of Patent Document 1 gives a tactile feedback to the user and makes the user feel a "push" of a key.

Patent Document 1: Japanese Patent Application Laid-Open No. 2005-303937,

However, the drive circuit that applies a drive signal frequently causes electromagnetic noise in the electronic device in Patent Document 1. Further, the electronic device of Patent Document 1 includes a sensor which detects a user's touch on a key.

Hence, the sensor is likely to cause an error operation due to the electromagnetic noise caused by the drive circuit in the electronic device of Patent Document 1.

SUMMARY OF THE INVENTION

It is therefore an object of the present disclosure to provide a vibrating device that can shield electromagnetic noise caused by a drive circuit, and prevent an error operation of a sensor.

A vibrating device according to the present invention includes a sensor; a vibrator which extends and contracts in a planar direction when a drive signal is applied to the vibrator; a drive circuit; and a vibrating body at least part of which is in contact with the vibrator, and that includes a conductor. The drive circuit applies a drive signal to the vibrator, and the vibrating body vibrates according to the drive signal. Further, the conductor is connected to a reference potential of the sensor.

Furthermore, in the vibrating device according to the present invention, the conductor is arranged between the sensor and the drive circuit.

Even in this configuration, too, the drive circuit that applies the drive signal causes electromagnetic noise. However, the conductor is arranged between the sensor and the drive circuit, and is connected to the reference potential of the sensor. Hence, the conductor shields the electromagnetic noise caused by the drive circuit.

Consequently, the vibrating device disclosed herein can prevent an error operation of the sensor.

Further, the disclosed vibrating device may employ the following aspect. That is, according to this aspect, the sensor may detect a touch operation, the drive circuit may apply a drive signal to the vibrator when the sensor detects the touch operation, and the vibrating body may be fixed in a state where a bending stress is produced.

According to this configuration, the sensor detects a user's touch on a key when the user performs a touch operation. Thus, the drive circuit applies the drive signal to the vibrator, and the vibrator extends and contracts in a planar direction. The vibrating body produces the bending stress, so that the vibrating body efficiently vibrates in response to extension and contraction of the vibrator. In this case, the vibrating device gives a tactile feedback to the user by transmitting the vibration to the user.

In addition, according to one aspect, the vibrating body may be fixed to the vibrator in a state where the vibrating body is curved in a direction orthogonal to a principal surface of the vibrator, or according to one aspect, the vibrating body may have a surface that is in a curved shape in a state where the vibrating body is not fixed to the vibrator, and produce a bending stress when fixed to the vibrator such that the surface becomes flat.

Further, according to one aspect, the sensor, the vibrating body and the vibrator may be stacked.

Furthermore, according to one aspect, the sensor may detect a touch on a touch panel attached to the vibrating body.

Still further, the vibrator can be made of a chiral polymer. When polylactic acid is used for the chiral polymers, it is possible to realize the vibrating device whose almost entire surfaces seen from a front view have high translucency by using a material having translucency for other components, too. Further, the chiral polymer can be poly-L-lactic acid (PLLA). The PLLA does not have pyroelectricity, and therefore is not influenced by a change in an ambient temperature.

Consequently, a strength of a vibration of the vibrating device is not changed by a change in an atmospheric temperature, heat generation of an electronic device or a change in a temperature caused by a touch of a finger. Consequently, it is possible to provide a stable tactile feedback.

In one aspect, the disclosed vibrating device includes a sensor; a vibrator at least part of which includes a conductor and which extends and contracts in a planar direction when a drive signal is applied to the vibrator; and a drive circuit. The drive circuit applies a drive signal to the vibrator to vibrate. Further, the conductor is connected to a reference potential of the sensor. Furthermore, in the vibrating device of a tactile presenting device according to the present invention, the conductor is arranged between the sensor and the drive circuit.

According to this configuration, too, the conductor is arranged between the sensor and the drive circuit, and is connected to the reference potential of the sensor. Hence, the conductor shields the electromagnetic noise caused by the drive circuit. Consequently, the disclosed vibrating device can prevent an error operation of the sensor.

Further, an entirety of the sensor is preferably overlapped by the conductor when seen from a plan view of the vibrating device.

According to this configuration, the conductor is sandwiched between the sensor and the drive circuit. That is, the conductor is positioned between the sensor and the drive circuit at all times.

Consequently, the conductor functions as a shielding plate, and can reliably shield electromagnetic noise caused by the drive circuit. Further, by using the conductor as the shielding plate, it is not necessary to perform an operation of adding a new part for shielding noise caused by the drive circuit. Consequently, the exemplary vibrating device disclosed herein can reliably prevent an error operation of the sensor.

According to the present disclosure, it is possible to shield electromagnetic noise produced by a drive circuit, and prevent an error operation of a sensor.

DETAILED DESCRIPTION

First Embodiment

Figure 1:
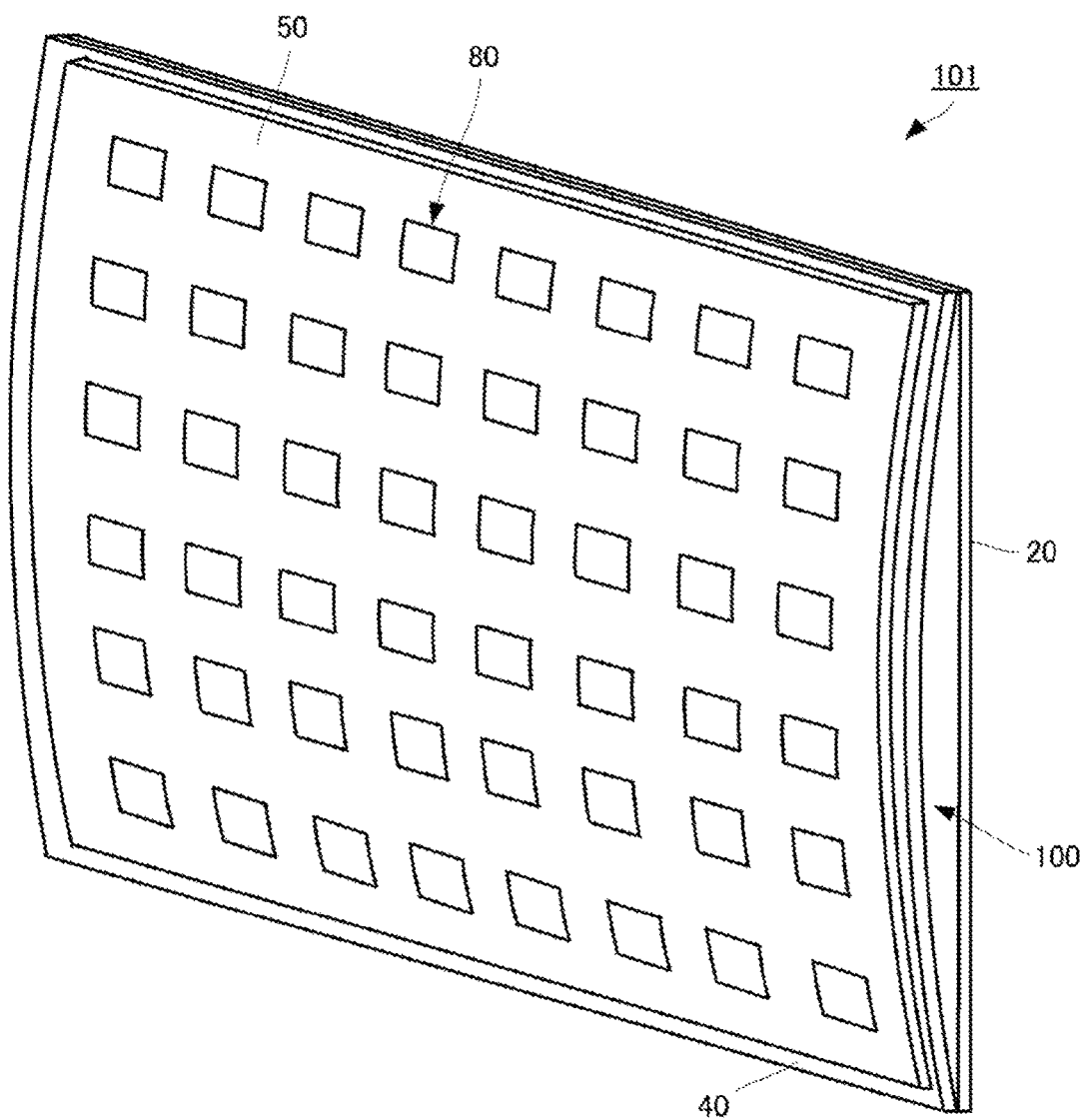
FIG. 1 is an external appearance perspective view of a vibrating device 101 according to a first embodiment.
Figure 2:
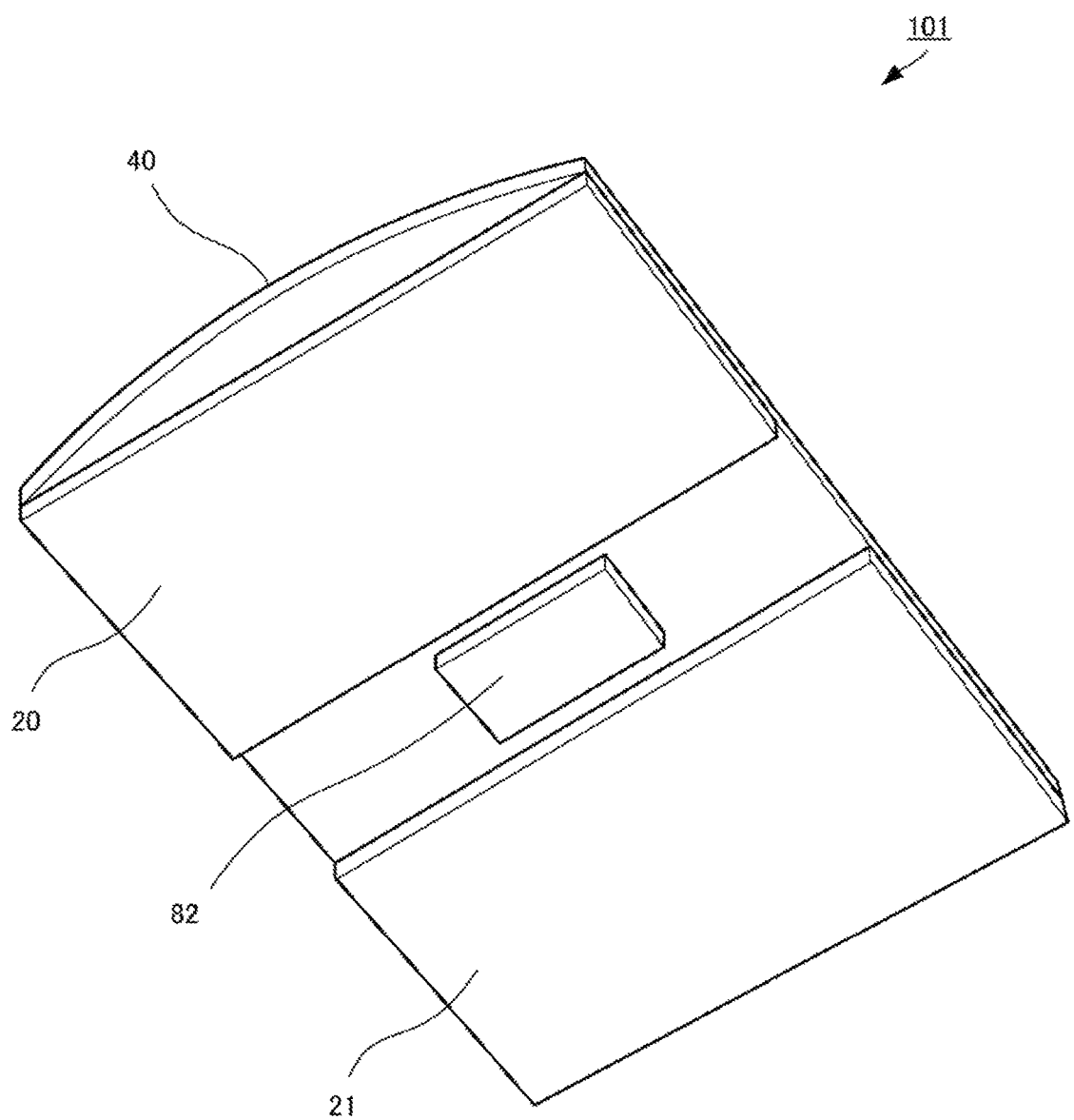
FIG. 2 is an external appearance perspective view of a back surface side of the vibrating device 101 illustrated in FIG. 1.
Figure 3:
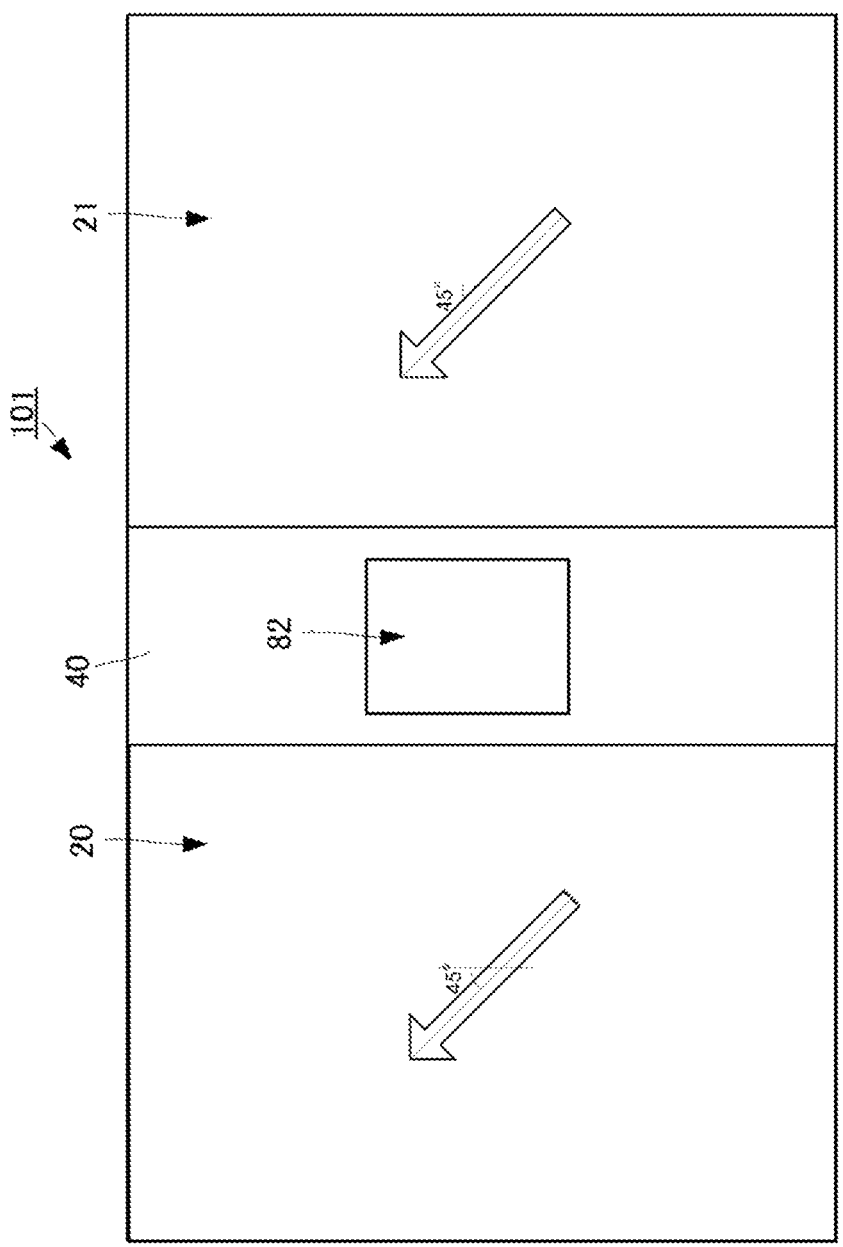
FIG. 3 is a back view of the vibrating device 101 illustrated in FIG. 1.
Figure 4:
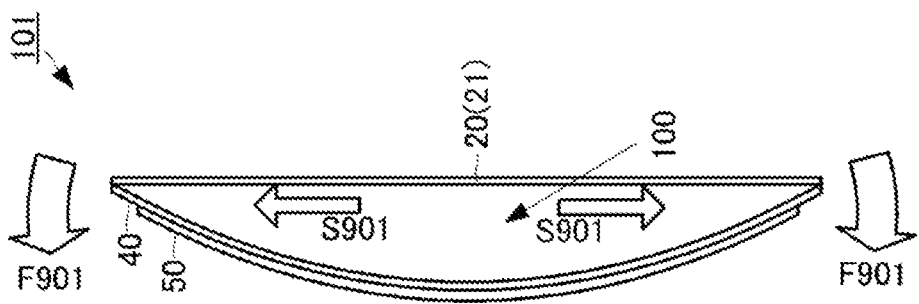
FIG. 4 is a side view of the vibrating device 101 illustrated in FIG. 1.

A vibrating device according to the first embodiment of the present invention will be described. FIG. 1 is an external appearance perspective view of a vibrating device 101 according to the first embodiment of the present invention. FIG. 2 is an external appearance perspective view of a back surface side of the vibrating device 101 illustrated in FIG. 1. FIG. 3 is a back view of the vibrating device 101 illustrated in FIG. 1, and FIG. 4 is a side view of the vibrating device 101 illustrated in FIG. 1.

The vibrating device 101 includes two vibrators 20 and 21, a diaphragm 40, a touch panel sensor 50 which is provided with a plurality of touch sensors 80, and a printed circuit board 82 on which a drive circuit 81 is formed. The vibrating device 101 is a so-called keyboard.

The touch panel sensor 50 of a flat shape is provided with a plurality of touch sensors 80 at positions meeting a key alignment. Further, the touch panel sensor 50 is attached to one principal surface (front surface) of the diaphragm 40 of the flat shape (planar shape). The touch panel sensor 50 is made of acrylic resin PMMA, for example.

In the exemplary aspect, each touch sensor 80 may adopt any type as long as each touch sensor 80 has a function of detecting a user's touch operation, and can use various types such as a membrane type, a capacitance type and a piezoelectric film type.

In addition, the touch panel sensor 50 is not provide in certain exemplary aspects. According to one aspect, a plurality of touch sensors 80 can also be provided at positions meeting a key alignment in the front surface of the diaphragm 40.

In the exemplary embodiment, the diaphragm 40 is a conductor composed of a metal plate of a flat shape, for example, and has a rectangular shape when seen from a plan view. Both ends of the diaphragm 40 in a lateral direction on the other principal surface (back surface) are fixed to (in contact with) the vibrators 20 and 21. The diaphragm 40 is arranged between the touch sensors 80 and the drive circuit 81.

In this regard, the diaphragm 40 can be considered the "vibrating body" according to the exemplary embodiment, and further corresponds to a "conductor" according to the exemplary embodiment.

Further, the touch panel sensor 50 provided with a plurality of touch sensors 80 is mounted on the one principal surface (front surface) of the diaphragm 40. Hence, the principal surface of the diaphragm 40 is larger than an area on which the touch sensors 80 are disposed, and the diaphragm 40 overlaps and covers the area on which the touch sensors 80 are disposed when seen from the plan view. That is, all touch sensors 80 overlap the diaphragm 40 which is the conductor when seen from the plan view. The diaphragm 40 is connected to a reference potential (e.g. 0 V which is a ground) of each touch sensor 80.

The printed circuit board 82 is disposed on a back surface of the diaphragm 40, and is positioned between the two vibrators 20 and 21. The printed circuit board 82 is fixed to a housing or the like which is not illustrated, and is disposed at this position, so that it is possible to effectively use a space of a vibrating unit and to miniaturize the vibrating device. Further, the printed circuit board 82 is disposed near a center of the diaphragm 40 and therefore overlaps the diaphragm 40 when seen from the plan view. Hence, the diaphragm 40 exhibits an effect of a shielding plate. In addition, the printed circuit board 82 does not need to be fixed to the housing, and only needs to be disposed at a position at which the printed circuit board 82 overlaps the diaphragm 40 when seen from the plan view.

Figure 5:
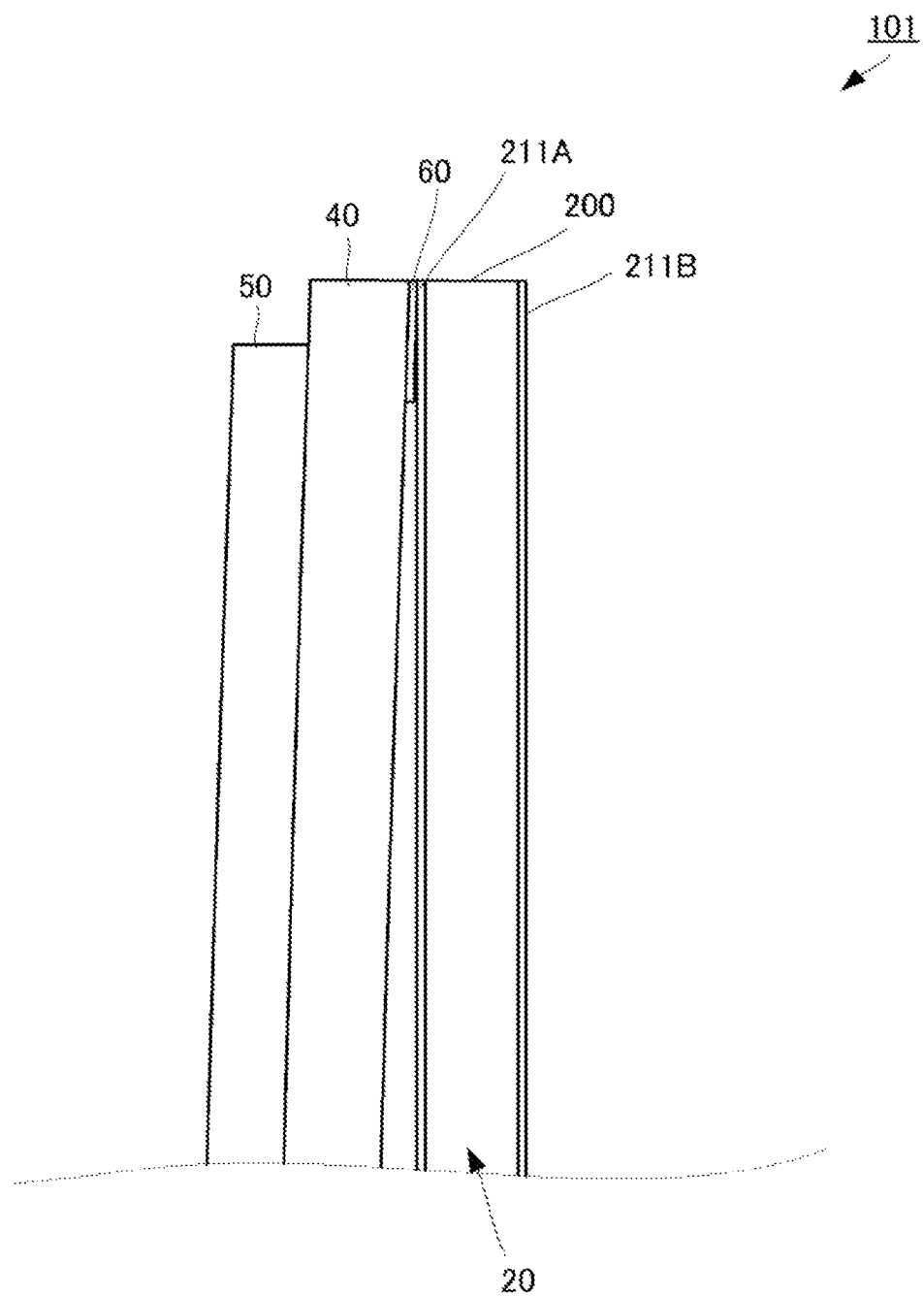
FIG. 5 is a partially enlarged side view of the vibrating device 101 illustrated in FIG. 1.

FIG. 5 is a partially enlarged side view of the vibrating device 101 illustrated in FIG. 1. The vibrator 20 is a piezoelectric film which includes a base film 200 of a rectangular shape when seen from the plan view, and an electrodes 211A and an electrode 211B formed on both opposing principal surfaces of the base film 200. In addition, a configuration of the vibrator 21 is the same as a configuration of the vibrator 20, and therefore will not be described.

The base film 200 is a piezoelectric resin such as polyvinylidene fluoride (PVDF).

In addition, a material such as chiral polymers can also be used for the base film 200. When the material of the chiral polymers is used for the base film 200, it is desirable to use polylactic acid (PLA) having high translucency. When the PLA is used, by using a material having high translucency for other components, too, it is possible to realize the vibrating device 101 whose almost entire surfaces when seen from a front view have high translucency. The PLLA in particular does not have pyroelectricity, and therefore is not influenced by a change in an ambient temperature. Consequently, when the base film 200 is made of the PLLA, a strength of a vibration is not changed by a change in an atmospheric temperature, heat generation of an electronic device or a change in a temperature caused by a touch of a finger. Thus, according to this embodiment, it is possible to provide a stable tactile feedback.

When the base film 200 is made of the PLLA, the base film 200 is formed in a rectangular shape by cutting the base film 200 such that each outer circumferential side forms approximately 45° in a stretching direction as illustrated in FIG. 3 to provide piezoelectricity.

The electrode 211A and the electrode 211B are formed on almost entire surfaces of the both principal surfaces of the base film 200. Aluminum deposited electrodes are preferably used for the electrode 211A and the electrode 211B.

In addition, when a mode of use requires translucency, the electrode 211A and the electrode 211B are preferably organic electrodes whose principal components are indium tin oxide (ITO), zinc oxide (ZnO) and polythiophene. Further, silver nanowire electrodes can also be used for the electrode 211A and the electrode 211B.

The drive circuit 81 is connected to the electrode 211A and the electrode 211B with an extended wiring conductor which is not illustrated interposed therebetween, and a drive signal is applied to the electrode 211A and the 211B via the wiring conductor. The electrode 211A disposed at a side of the diaphragm 40 is attached to the diaphragm 40 with an adhesive layer 60 interposed therebetween.

Figure 6:
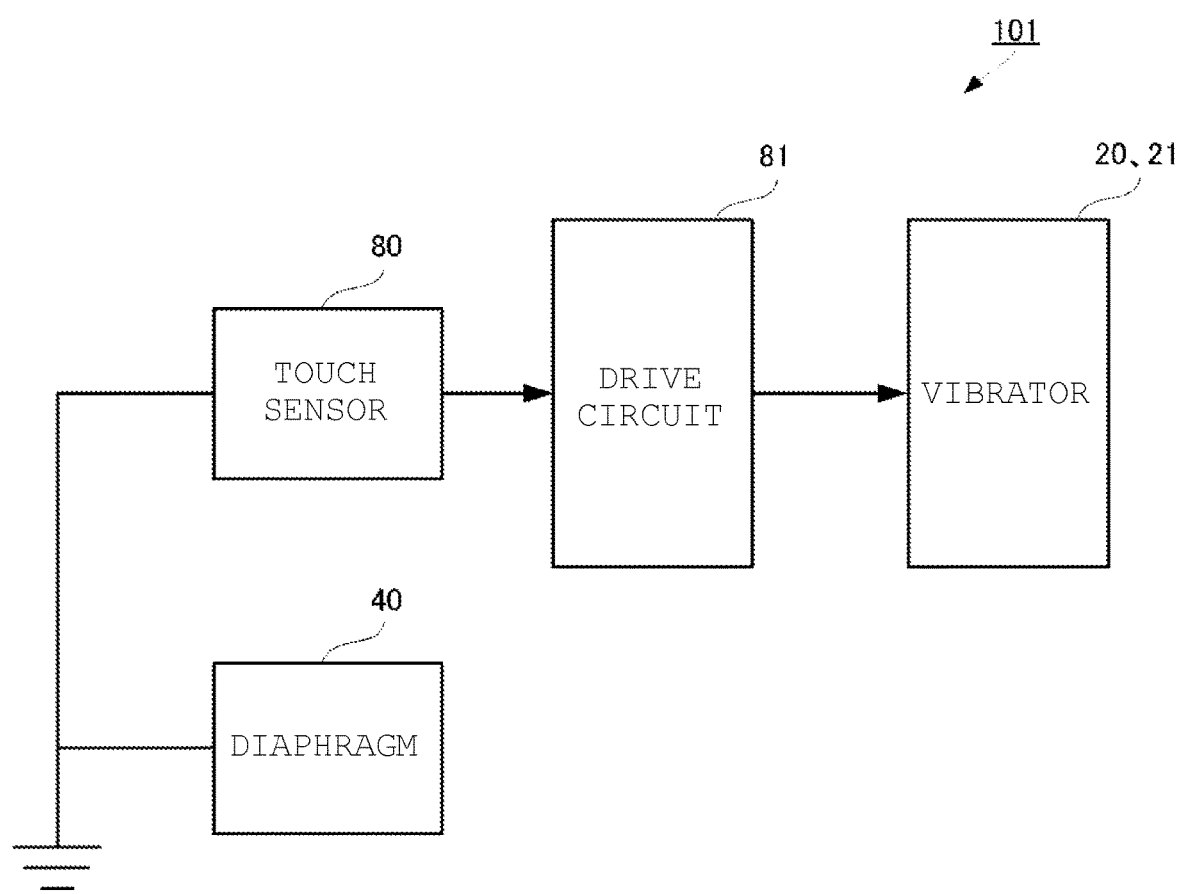
FIG. 6 is a block diagram illustrating a configuration of the vibrating device 101 illustrated in FIG. 1.

FIG. 6 is a block diagram illustrating a configuration of the vibrating device 101 illustrated in FIG. 1. As illustrated in FIG. 6, the drive circuit 81 is further connected to a plurality of touch sensors 80.

Hence, when a user touches each touch sensor 80 provided to the touch panel sensor 50, the drive circuit 81 applies a drive signal to the electrodes 211A and the electrodes 211B of the vibrator 20. Thus, the vibrator 20 extends and contracts in a planar direction.

Back to FIGS. 1 and 4, the diaphragm 40 is fixed to the vibrators 20 and 21 such that the diaphragm 40 has a shape which is curved and protruding toward an opposite side (a front side of the diaphragm 40) to a side (a back surface side of the diaphragm 40) at which the vibrators 20 and 21 are provided.

According to this configuration, a hollow area 100 is formed between the diaphragm 40 and the vibrators 20 and 21. Further, a side at which this diaphragm 40 is provided is the front surface side of the vibrating device 101, and a side at which the vibrators 20 and 21 are provided is a back surface side of the vibrating device 101.

In this regard, in the present embodiment, a curved state of the diaphragm 40 is exaggerated in the illustration for ease of explanation.

In the exemplary embodiment, it is desirable that the principal surface of the diaphragm 40 and the principal surfaces of the vibrators 20 and 21 are as parallel as possible, and the hollow area 100 is as small as possible.

Thus, the diaphragm 40 is fixed to the vibrators 20 and 21 in a state where the surface of diaphragm is curved, and therefore is fixed to the vibrators 20 and 21 in a state where a bending stress is applied to the diaphragm 40 as indicated by an outlined arrow F901 in FIG. 4.

Further, as indicated by an outlined arrow S901 in FIG. 4, a tensile force is applied to the vibrator 20 in a longitudinal direction of the principal surface of the vibrator 20. As indicated by the outlined arrow S901 in FIG. 4, a tensile force is applied to the vibrator 21, too, in a longitudinal direction of the principal surface of the vibrator 21.

Figure 7:
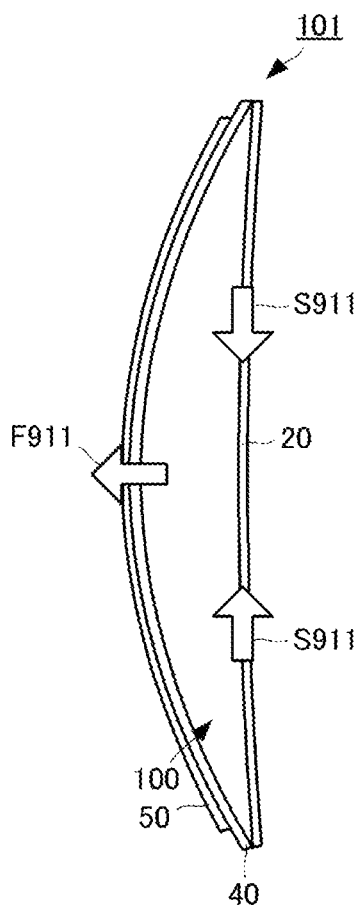
FIG. 7 is an operation explanatory view of the vibrating device 101 illustrated in FIG. 1.
Figure 8:
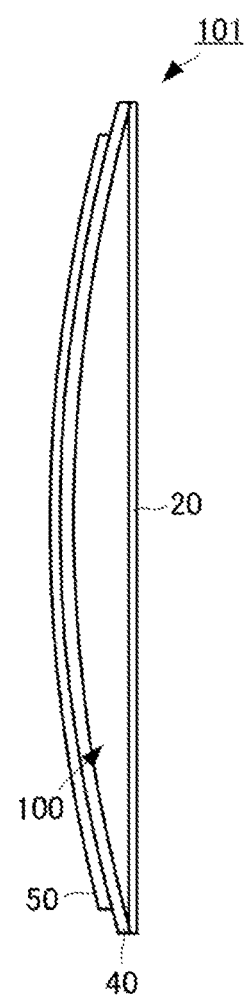
FIG. 8 is an operation explanatory view of the vibrating device 101 illustrated in FIG. 1.
Figure 9:
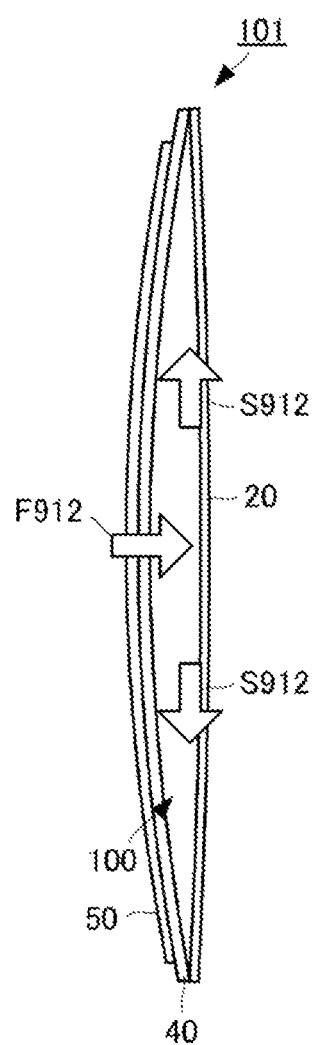
FIG. 9 is an operation explanatory view of the vibrating device 101 illustrated in FIG. 1.

FIGS. 7 to 9 are operation explanatory views of the vibrating device 101. FIG. 7 illustrates a state at a timing at which the vibrator 20 contracts according to a drive signal. FIG. 8 illustrates a state where a drive signal is not applied or an amplitude of a drive signal is 0. FIG. 9 illustrates a state at a timing at which the vibrator 20 extends according to a drive signal. In addition, an operation of the vibrator 21 is the same as an operation of the vibrator 20, and therefore will not be described.

When the drive circuit 81 applies a drive signal to the vibrator 20, and applies an electric field in a first direction to a piezoelectric body of the vibrator 20, the vibrator 20 contracts along a direction indicated by an arrow S911 in FIG. 7. The vibrator 20 is attached to both fixed ends of the diaphragm 40.

Hence, in response to the contraction of the vibrator 20, a portion (an end portion in the lateral direction) of the diaphragm 40 fixed to the vibrator 20 is pulled toward a center direction. Thus, the diaphragm 40 is curved and protruding forward as indicated by an arrow F911 in FIG. 6(A).

Meanwhile, when the drive circuit 81 applies a drive signal to the piezoelectric body of the vibrator 20, and applies an electric field in a second direction opposite to the first direction, the vibrator 20 extends along a direction indicated by an arrow S912 in FIG. 9. The vibrator 20 is attached to both fixed ends of the diaphragm 40.

Hence, in response to the extension of the vibrator 20, a portion (the end portion in the lateral direction) of the diaphragm 40 fixed to the vibrator 20 is pulled from the center direction. Thus, the diaphragm 40 is curved and protruding forward with a less protrusion amount as indicated by an arrow F912 in FIG. 9.

Hence, the diaphragm 40 transitions to a state in FIG. 7 or a state in FIG. 9 based on a state in FIG. 8 according to an amplitude of a drive signal, and vibrates along a front surface direction and a back surface direction (a direction orthogonal to the principal surface of the diaphragm 40). Thus, the vibration corresponding to the drive signal is transmitted to the touch panel sensor 50 via the diaphragm 40, and is fed back to the user who has touched the touch panel sensor 50.

Consequently, when the user touches each touch sensor 80 of the touch panel sensor 50, an operation surface vibrates, so that the user can feel the "push" of the key.

Further, a stationary bending stress is applied to the diaphragm 40 in a non-active state, so that a force applied to the diaphragm 40 during extension of the vibrator 20 is in the same direction as that of the bending stress. Consequently, the vibrating device 101 can efficiently vibrate the diaphragm 40, and transmit a vibration which is strong to some degree even when vibrators are used. Further, compared to a case where a vibration is caused by a motor or the like, it is possible to make the vibrating device 101 thin.

In addition, soft resin such as silicone gel is desirably filled in the hollow area 100 to suppress a sound caused by the vibration of the diaphragm 40.

In the above configuration, the drive circuit 81 which applies the drive signal causes electromagnetic noise. However, the diaphragm 40 which is the conductor is arranged between each touch sensor 80 and the drive circuit 81, and is connected to the reference potential of each touch sensor 80. Hence, the diaphragm 40 shields the electromagnetic noise caused by the drive circuit 81.

Consequently, the vibrating device 101 according to the present embodiment can prevent an error operation of each touch sensor 80.

Further, all touch sensors 80 preferably overlap the diaphragm 40 when seen from the plan view. Hence, the diaphragm 40 is sandwiched between all touch sensors 80 and the drive circuit 81, and the diaphragm 40 is positioned between the touch sensors 80 and the drive circuit 81 at all times. Consequently, the diaphragm 40 which is the conductor functions as a shielding plate, and can reliably shield electromagnetic noise caused by the drive circuit 81. Further, by using the diaphragm 40 as the shielding plate, it is not necessary to perform an operation of adding a new part for shielding noise caused by the drive circuit 81.

Consequently, the vibrating device 101 according to the present embodiment can reliably prevent an error operation of each touch sensor 80.

Second Embodiment

Next, a display device according to the second embodiment of the present invention will be described.

Figure 10:
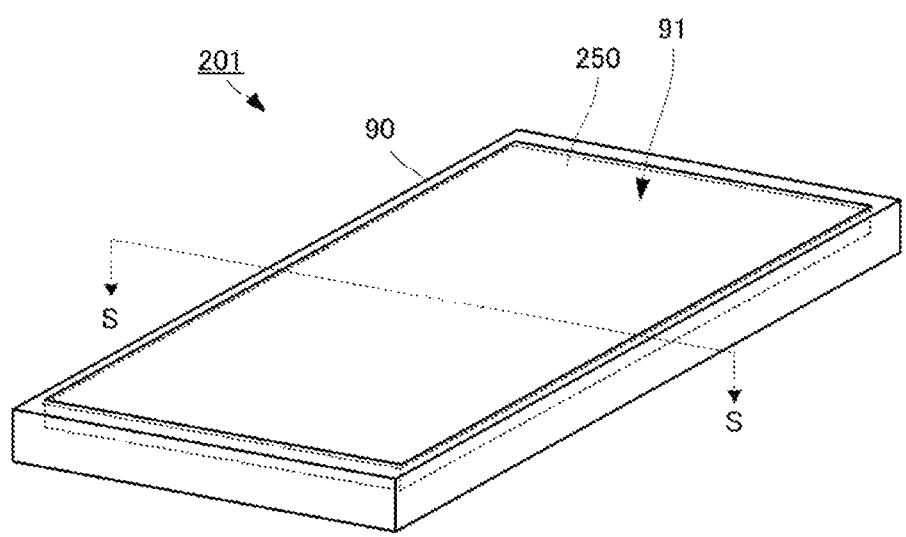
FIG. 10 is an external appearance perspective view of a display device 201 according to a second embodiment.
Figure 11:
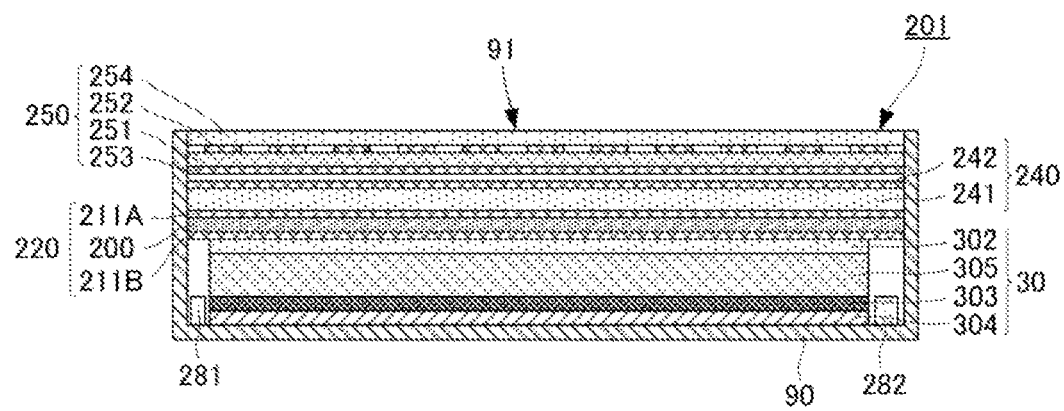
FIG. 11 is a sectional view taken along a line S-S illustrated in FIG. 10.
Figure 12:
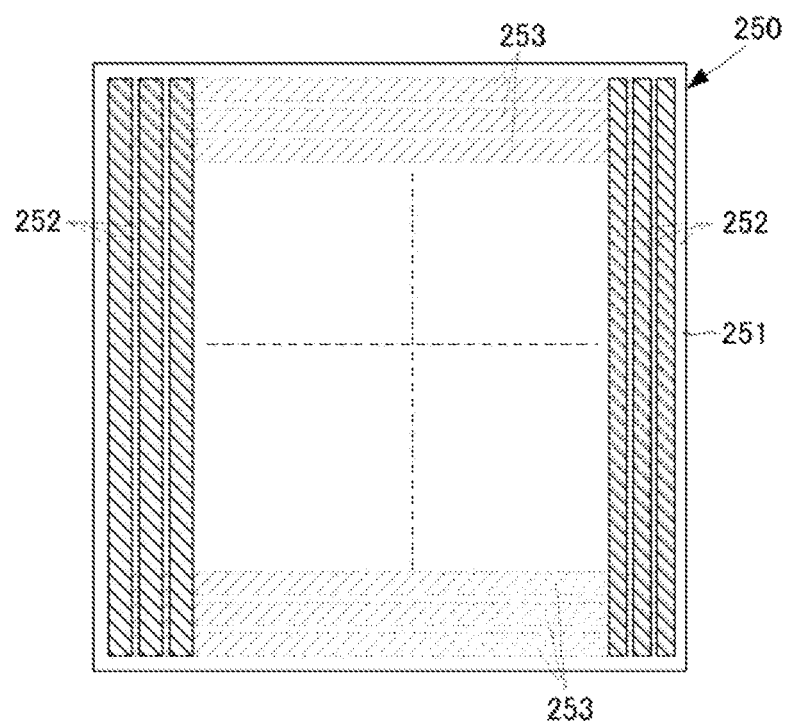
FIG. 12 is a plan view of a touch panel sensor 250 illustrated in FIG. 10.
Figure 13:
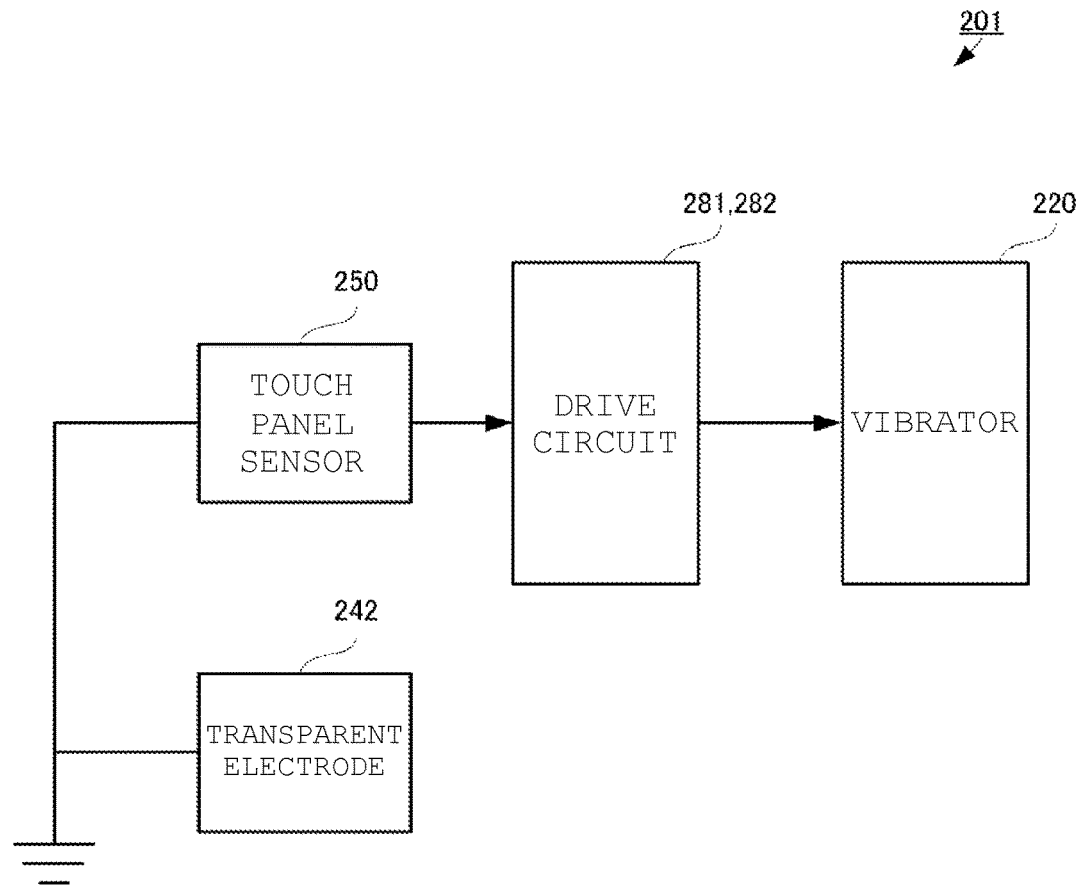
FIG. 13 is a block diagram illustrating a configuration of a display device 201 illustrated in FIG. 10.

FIG. 10 is an external appearance perspective view of a display device 201 according to the second embodiment of the present invention. FIG. 11 is a sectional view taken along a line S-S illustrated in FIG. 10. FIG. 12 is a plan view of a touch panel sensor 250 illustrated in FIG. 10. FIG. 12 is a view illustrating a state where a protection film 254 is detached. FIG. 13 is a block diagram illustrating a configuration of the display device 201 illustrated in FIG. 10.

As illustrated in FIG. 1, the display device 201 includes a housing 90 which has a portable size. The display device 201 is, for example, a tablet or a smartphone. In this aspect, the display device 201 can be considered the "vibrating device" according to an exemplary embodiment.

The housing 90 has a cuboid shape whose length and width are larger than the thickness, and whose top panel is opened. As illustrated in FIGS. 10 and 11, the touch panel sensor 250 of a flat shape is fitted to the housing 90 to block an opening surface of the housing 90. One principal surface of the touch panel sensor 250 is an operation surface 91. The touch panel sensor 250 is made of a material having translucency.

In addition, the touch panel sensor 250 broadly can be considered the "sensor" according to one exemplary embodiment.

As illustrated in FIGS. 10 and 11, in the housing 90, the touch panel sensor 250, a diaphragm 240, a vibrator 220, a display unit 30 and drive circuit modules 281 and 282 are disposed in this order from the side of the operation surface 91.

The touch panel sensor 250, the diaphragm 240, the vibrator 220 and the display unit 30 have flat shapes. The touch panel sensor 250, the diaphragm 240, the vibrator 220 and the display unit 30 are disposed in the housing 90 by being stacked such that the respective surfaces are parallel to the operation surface 91 of the housing 90.

In addition, the diaphragm 240 can be considered the "vibrating body" according to an exemplary embodiment.

The drive circuit modules 281 and 282 are mounted between a bottom surface of the housing 90 and the vibrator 220. The drive circuit modules 281 and 282 are connected with each other by a connection wire which is not illustrated. The drive circuit module 281 is connected to the touch panel sensor 250. The drive circuit module 282 is connected to the vibrator 220.

As illustrated in FIGS. 11 and 12, the touch panel sensor 250 includes an insulation substrate 251 of a flat shape, a plurality of capacitance detection electrodes 252 and 253 and a protection film 254.

The protection film 254 is provided on a surface of the touch panel sensor 250 at an opposite side to the vibrator 220. The protection film 254 is made of a material having flexibility and an insulation property. The protection film 254 is made of a material having translucency. For example, it is suitable to use PET, PP, polycarbonate (PC) or glass for the protection film 254.

The insulation substrate 251 is made of a material having translucency. A plurality of capacitance detection electrodes 252 is formed on one flat surface of the insulation substrate 251. A plurality of capacitance detection electrodes 252 has an elongated shape whose elongation direction lies along a first direction. A plurality of capacitance detection electrodes 252 is disposed at intervals along a second direction orthogonal to the first direction.

A plurality of capacitance detection electrodes 253 is formed on the other flat surface of the insulation substrate 251. A plurality of capacitance detection electrodes 253 has an elongated shape whose elongation direction lies along the second direction. A plurality of capacitance detection electrodes 253 is disposed at intervals along the first direction. Preferably, the plurality of capacitance detection electrodes 252 and 253 are made from a translucent material.

The touch panel sensor 250 detects a change in a capacitance produced in response to an approach or a touch of a user's finger via the capacitance detection electrodes 252 and 253, and outputs a signal based on this detection as an operation detection signal to the drive circuit module 281.

The diaphragm 240 is composed of a transparent plate 241 and a transparent electrode 242.

The transparent plate 241 is made of a non-conductive transparent material such as PET, polycarbonate (PC), PLLA or glass. The transparent electrode 242 is formed on a surface of the transparent plate 241. The transparent electrode 242 is made of a metal material such as indium tin oxide (ITO) having high transparency.

The transparent electrode 242 forms the "conductor" according to an exemplary embodiment. Hence, part of the diaphragm 240 includes a planar conductor. The transparent electrode 242 of the diaphragm 240 is connected to a reference potential (e.g. 0 V which is a ground) of the touch panel sensor 250. A space is provided between the transparent electrode 242 of the diaphragm 240 and the touch panel sensor 250 to secure the insulation property. Further, as illustrated in FIG. 11, a principal surface of the transparent electrode 242 has a substantially equal size to a principal surface of the touch panel sensor 250, and the transparent electrode 242 overlaps and covers the touch panel sensor 250 when seen from a plan view. That is, the entire touch panel sensor 250 overlaps the transparent electrode 242 when seen from the plan view.

The vibrator 220 is a flat plate of a rectangular shape when seen from the plan view, and has a smaller area than that of the diaphragm 240. The vibrator 220 differs from a vibrator 20 only in a shape, and has the same configuration as that of the vibrator 20. The vibrator 220 is pasted (in contact with) at an approximately center of the other principal surface of the diaphragm 240 when seen from a plan view.

The drive circuit module 282 is connected to an electrode 211A and an electrode 211B of the vibrator 220 with an extended wiring conductor which is not illustrated interposed therebetween, and a drive signal is applied to the electrode 211A and the 211B via the wiring conductor.

The display unit 30 is disposed inside the housing 90. The display unit 30 is composed of a so-called flat display, and is more specifically composed of a liquid crystal display element. The display unit 30 includes a liquid crystal panel 305, a top surface polarizing plate 302, a back surface polarizing plate 303 and a backlight 304. The top surface polarizing plate 302 and the back surface polarizing plate 303 are disposed to sandwich the liquid crystal panel 305. The backlight 304 is disposed at an opposite side to the liquid crystal panel 305 and across the back surface polarizing plate 303.

According to the above configuration, when the user touches the operation surface 91 of the touch panel sensor 250, the drive circuit module 282 applies a drive signal to the electrode 211A and the electrode 211B of the vibrator 220. Thus, the vibrator 220 extends and contracts in a planar direction.

Consequently, when the user touches the operation surface 91 of the touch panel sensor 250, the operation surface 91 vibrates, so that the user can feel the "push" of the key.

In this regard, the drive circuit module 282 which applies the drive signal causes electromagnetic noise. However, the transparent electrode 242 which is the conductor is arranged between the touch panel sensor 250 and the drive circuit module 282, and is connected to the reference potential of the touch panel sensor 250.

Further, the entire touch panel sensor 250 overlaps the transparent electrode 242 when seen from the plan view. Hence, the transparent electrode 242 is sandwiched between the touch panel sensor 250 and the drive circuit modules 281 and 282, and the transparent electrode 242 is positioned between the touch panel sensor 250 and the drive circuit modules 281 and 282 at all times.

Consequently, the transparent electrode 242 functions as a shielding plate, and can reliably shield electromagnetic noise caused by the drive circuit module 282. Further, by using the transparent electrode 242 as the shielding plate, it is not necessary to perform an operation of adding a new part for shielding noise caused by the drive circuit module 282.

Consequently, the display device 201 according to the present embodiment can reliably prevent an error operation of the touch panel sensor 250 similar to a vibrating device 101.

Third Embodiment

Next, a display device according to the third embodiment of the present invention will be described.

Figure 14:
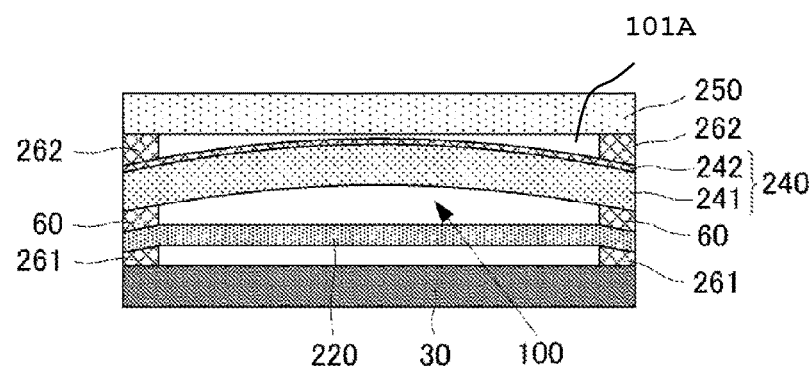
FIG. 14 is a sectional view illustrating a structure of the touch panel 250, a diaphragm 240, a vibrator 220 and a display unit 30 of a display device according to a third embodiment.

FIG. 14 is a sectional view illustrating a structure of a touch panel 250, a diaphragm 240, a vibrator 220 and a display unit 30 of a display device according to the third embodiment of the present invention.

The display device according to the third embodiment differs from the above-described display device 201 in the structure of the touch panel 250, the diaphragm 240, the vibrator 220 and the display unit 30. The other components are substantially the same and therefore will not be described.

In addition, in the present embodiment, the touch panel sensor 250 forms the "sensor" according to an exemplary embodiment, and the diaphragm 240 forms the "vibrating body" according to an exemplary embodiment.

In the display device according to the third embodiment, the touch panel sensor 250, the diaphragm 240, the vibrator 220 and the display unit 30 are stacked in this order.

The diaphragm 240 is composed of a transparent plate 241 and a transparent electrode 242.

The transparent electrode 242 forms the "conductor" according to an exemplary embodiment. Hence, part of the diaphragm 240 includes a planar conductor. The transparent electrode 242 of the diaphragm 240 is connected to a reference potential (e.g. 0 V which is a ground) of the touch panel sensor 250.

The diaphragm 240 is a flat plate of a rectangular shape when seen from a plan view, and is fixed to (in contact with) the vibrator 220 with an adhesive layer 60 interposed therebetween such that the diaphragm 240 has a curved shape protruding to an opposite side (an upper side in FIG. 14) to the side at which the vibrator 220 is provided.

According to this configuration, a hollow area 100 is formed between the diaphragm 240 and the vibrator 220 similar to the vibrating device 101.

The diaphragm 240 is fixed to (in contact with) the vibrator 220 in a state where the diaphragm 240 is curved in a direction orthogonal to a principal surface of the vibrator 220, and a bending stress is produced in the diaphragm 240.

The touch panel sensor 250 has a flat plate of a rectangular shape when seen from a plan view. Both ends (left and right ends in FIG. 14) of the touch panel sensor 250 in a lateral direction on the other principal surface (a lower surface in FIG. 14) are fixed to the diaphragm 240 with a spacer 262 interposed therebetween. As illustrated in FIG. 14, the touch panel sensor 250 is fixed to the diaphragm 240 with the spacer 262 interposed therebetween, so that the principal surface becomes flat. According to this configuration, a hollow area 100A is formed between the diaphragm 240 and the touch panel sensor 250.

The display unit 30 is a flat plate of a rectangular shape when seen from the plan view. Both ends (left and right ends in FIG. 14) of the display unit 30 in the lateral direction on one principal surface (an upper surface in FIG. 14) are fixed with a the spacer 261 interposed therebetween. As illustrated in FIG. 14, the display unit 30 is fixed with the spacer 261 interposed therebetween, so that the principal surface becomes flat.

According to the above configuration, when the user touches an operation surface of the touch panel sensor 250, a drive circuit module applies a drive signal to the vibrator 220. Thus, the vibrator 220 extends and contracts in a planar direction.

Consequently, when the user touches the operation surface of the touch panel sensor 250, the operation surface vibrates, so that the user can feel the "push" of the key.

Further, the diaphragm 240 gives a stationary bending stress in a non-active state, so that the diaphragm 240 efficiently vibrates in response to extension or contraction of the vibrator 220. Furthermore, the principal surface of the touch panel sensor 250 becomes flat. Consequently, it is possible to realize a touch panel whose keys can be easily operated by a user.

In this regard, a drive circuit module which applies the drive signal causes electromagnetic noise. However, the transparent electrode 242 of the diaphragm 240 is arranged between the touch panel sensor 250 and the drive circuit module, and the transparent electrode 242 is connected to the reference potential of the touch panel sensor 250.

Further, a principal surface of the transparent electrode 242 has a substantially equal size to the principal surface of the touch panel sensor 250 when seen from the plan view, and the transparent electrode 242 overlaps and covers the touch panel sensor 250 when seen from the plan view. That is, the entire touch panel sensor 250 overlaps the transparent electrode 242 when seen from the plan view similar to the display device 201. Hence, the transparent electrode 242 is sandwiched between the touch panel sensor 250 and the drive circuit module, and the transparent electrode 242 is positioned between the touch panel sensor 250 and the drive circuit module at all times. Consequently, the transparent electrode 242 functions as a shielding plate, and reliably shields electromagnetic noise caused by the drive circuit module.

In addition, in the present embodiment, the two hollow areas 100 and 100A are formed in front of the display unit 30 (in an upper direction in FIG. 14).

Consequently, it is preferable to perform refractive index matching by filling a transparent resin material in the hollow areas 100 and 100A. Consequently, it is possible to prevent a decrease in display quality (grade) due to internal reflection of external light. More specifically, by filling in the hollow area 100 a transparent resin material having a refractive index between the refractive index of the diaphragm 240 and the refractive index of the vibrator 220, the refractive index matching is performed. Further, refractive index matching is performed by filling in the hollow area 100A a transparent resin material having a refractive index between the refractive index of the touch panel sensor 250 and the refractive index of the diaphragm 240.

Furthermore, the touch panel sensor 250 may be directly attached to (in contact with) one principal surface of the diaphragm 240 without the spacer 262 interposed therebetween.

Fourth Embodiment

Next, a display device according to the fourth embodiment of the present invention will be described.

Figure 15:
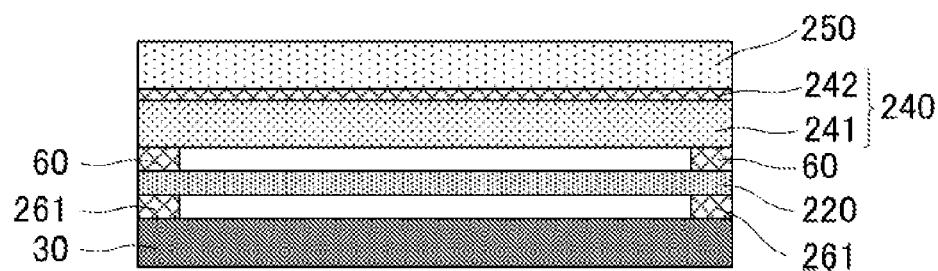
FIG. 15 is a sectional view illustrating a structure of the touch panel 250, the diaphragm 240, the vibrator 220 and the display unit 30 of a display device according to a fourth embodiment.

FIG. 15 is a sectional view illustrating a structure of a touch panel 250, a diaphragm 240, a vibrator 220 and a display unit 30 of the display device according to the fourth embodiment.

The display device according to the fourth embodiment differs from the above-described display device 201 in that the diaphragm 240 has a surface that is in a curved shape when the diaphragm 240 is not fixed to the vibrator 220, and is fixed to the vibrator 220 such that the surface becomes flat. The other components are substantially the same and therefore will not be described.

In addition, in the present embodiment, the diaphragm 240 forms the "vibrating body".

The diaphragm 240 is composed of a transparent plate 241 and a transparent electrode 242.

The transparent electrode 242 forms the "conductor" according to the exemplary embodiment. Hence, part of the diaphragm 240 includes a planar conductor. The transparent electrode 242 of the diaphragm 240 is connected to a reference potential (e.g. 0 V which is a ground) of the touch panel sensor 250.

The diaphragm 240 has a rectangular shape when seen from a plan view, and has such a shape that a surface of the diaphragm 240 is curved in a back surface direction in a state where the diaphragm 240 is not fixed. This shape can be realized by bending, for example, a diaphragm having a flat principal surface by heat processing. While a bending force is applied to both ends (left and right ends in FIG. 15) of the diaphragm 240 in a lateral direction, the diaphragm 240 is fixed to (in contact with) one principal surface of the vibrator 220 (an upper surface of the vibrator 220 in FIG. 15) with an adhesive layer 60 interposed therebetween. Hence, the diaphragm 240 is fixed to (in contact with) the vibrator 220 in a state where the bending stress is applied to the diaphragm 240. Further, as illustrated in FIG. 15, a principal surface of the diaphragm 240 becomes flat.

The touch panel sensor 250 is a flat plate of a rectangular shape when seen from the plan view, and is attached to one principal surface (an upper surface in FIG. 15) of the diaphragm 240. Further, the display unit 30 is a flat plate of a rectangular shape when seen from the plan view, and both ends (left and right ends in FIG. 15) of the display unit 30 in the lateral direction on one principal surface are fixed with a spacer 261 interposed therebetween.

According to the above configuration, when the user touches an operation surface of the touch panel sensor 250, a drive circuit module applies a drive signal to the vibrator 220. Thus, the vibrator 220 extends and contracts in a planar direction.

Consequently, when the user touches the operation surface of the touch panel sensor 250, the operation surface vibrates, so that the user can feel the "push" of the key.

Further, the diaphragm 240 gives a stationary bending stress in a non-active state, so that the diaphragm 240 efficiently vibrates in response to extension or contraction of the vibrator 220. Furthermore, the principal surface of the touch panel sensor 250 becomes flat. Consequently, it is possible to realize a touch panel whose keys can be easily operated by a user.

In this regard, a drive circuit module which applies the drive signal causes electromagnetic noise. However, the transparent electrode 242 which is the conductor is arranged between the touch panel sensor 250 and the drive circuit module, and is connected to the reference potential of the touch panel sensor 250.

Further, a principal surface of the transparent electrode 242 has a size larger than the principal surface of the touch panel sensor 250 when seen from the plan view, and the transparent electrode 242 overlaps and covers the touch panel sensor 250 when seen from the plan view. That is, the entire touch panel sensor 250 overlaps the transparent electrode 242 when seen from the plan view similar to the display device 201. Hence, the transparent electrode is sandwiched between the touch panel sensor 250 and the drive circuit module, and the transparent electrode 242 is positioned between the touch panel sensor 250 and the drive circuit module at all times. Consequently, the transparent electrode 242 functions as a shielding plate, and reliably shields electromagnetic noise caused by the drive circuit module.

Fifth Embodiment

Next, a display device according to the fifth embodiment of the present invention will be described.

Figure 16:
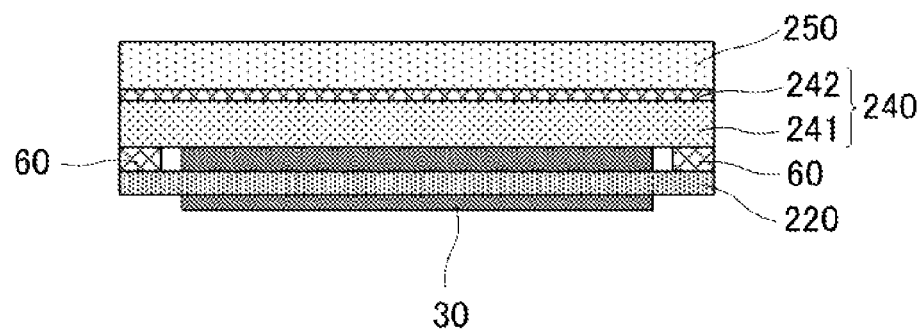
FIG. 16 is a sectional view illustrating a structure of the touch panel 250, the diaphragm 240, vibrators 220 and 221 and the display unit 30 of a display device according to a fifth embodiment.
Figure 17:
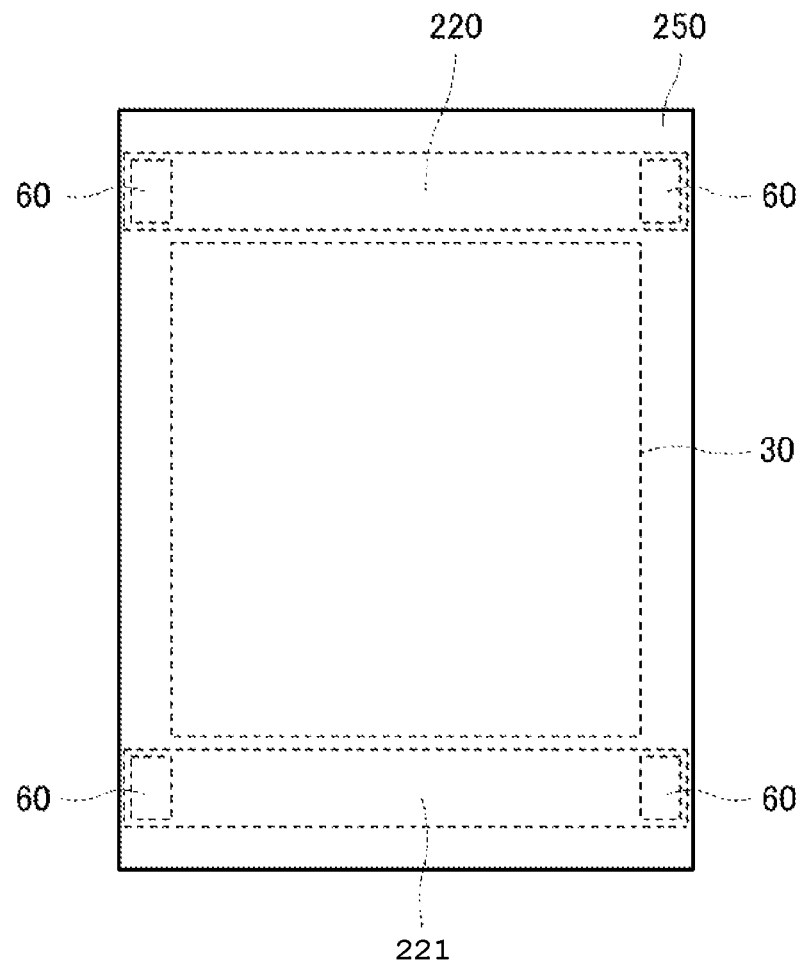
FIG. 17 is a plan view illustrating a structure of the touch panel 250, the diaphragm 240, the vibrators 220 and 221 and the display unit 30 of a display device according to the fifth embodiment.

FIG. 16 is a sectional view illustrating a structure of a touch panel 250, a diaphragm 240, vibrators 220 and 221 and a display unit 30 of the display device according to the fifth embodiment. FIG. 17 is a plan view illustrating the structure of the touch panel 250, the diaphragm 240, the vibrators 220 and 221 and the display unit 30 of the display device according to the fifth embodiment.

The display device according to the fifth embodiment differs from the display device according to the fourth embodiment in that the display device according to the fifth embodiment includes the two vibrators 220 and 221, and in a shape of the display unit 30. The other components are substantially the same and therefore will not be described.

In addition, in the present embodiment, the diaphragm 240 forms the "vibrating body".

The diaphragm 240 is composed of a transparent plate 241 and a transparent electrode 242.

The transparent electrode 242 forms the "conductor" according to the exemplary embodiment. Hence, part of the diaphragm 240 includes a planar conductor. The transparent electrode 242 of the diaphragm 240 is connected to a reference potential (e.g. 0 V which is a ground) of the touch panel sensor 250.

The diaphragm 240 has a rectangular shape when seen from a plan view, and has such a shape that a surface of the diaphragm 240 is curved in a back surface direction in a state where the diaphragm 240 is not fixed. The two vibrators 220 and 221 are flat plates of rectangular shapes when seen from the plan view. The vibrators 220 and 221 are disposed at both ends (an upper end and a lower end of the diaphragm 240 in FIG. 17) of the diaphragm 240 in a longitudinal direction. While a bending force is applied to both ends (left and right ends in FIG. 16) of the diaphragm 240 in a lateral direction, the diaphragm 240 is fixed to (in contact with) one principal surface of the vibrator 220 (an upper surface of the vibrator 220 in FIG. 16(A)) with an adhesive layer 60 interposed therebetween. In addition, a method for fixing the vibrator 221 is the same as that of the vibrator 220, and therefore will not be described. Hence, the diaphragm 240 is fixed to (in contact with) the vibrators 220 and 221 in a state where the bending stress is applied to the diaphragm 240. As illustrated in FIG. 16(A), a principal surface of the diaphragm 240 becomes flat.

The display unit 30 is a flat plate of a rectangular shape when seen from the plan view, and has a smaller area than that of the diaphragm 240. The display unit 30 is disposed at an approximately center of the other principal surface of the diaphragm 240 and between the vibrator 220 and the vibrator 221 when seen from the plan view. Hence, as illustrated in FIG. 16(B), the display unit 30 does not overlap the vibrators 220 and 221 when seen from the plan view, and is directly attached to the other principal surface of the diaphragm 240.

According to the above configuration, when a user touches an operation surface of the touch panel sensor 250, a drive circuit module applies a drive signal to the vibrators 220 and 221. Thus, the vibrators 220 and 221 stretch and contract in a planar direction.

Consequently, when the user touches the operation surface of the touch panel sensor 250, the operation surface vibrates, so that the user can feel the "push" of the key.

Further, the diaphragm 240 gives a stationary bending stress in a non-active state, so that the diaphragm 240 efficiently vibrates in response to extension or contraction of the vibrators 220 and 221. Furthermore, the principal surface of the touch panel sensor 250 becomes flat. Consequently, it is possible to realize a touch panel whose keys can be easily operated by a user.

In this regard, a drive circuit module which applies the drive signal causes electromagnetic noise. However, the transparent electrode 242 which is the conductor is arranged between the touch panel sensor 250 and the drive circuit module, and the transparent electrode 242 is connected to the reference potential of the touch panel sensor 250.

Further, a principal surface of the transparent electrode 242 has a substantially equal size to the principal surface of the touch panel sensor 250, and the transparent electrode 242 overlaps and covers the touch panel sensor 250 when seen from the plan view. That is, the entire touch panel sensor 250 overlaps the transparent electrode 242 when seen from the plan view similar to the display device 201. Hence, the transparent electrode 242 is sandwiched between the touch panel sensor 250 and the drive circuit module, and the transparent electrode 242 is positioned between the touch panel sensor 250 and the drive circuit module at all times. Consequently, the transparent electrode 242 functions as a shielding plate, and reliably shields electromagnetic noise caused by the drive circuit module.

Further, the display unit 30 is directly attached to the other principal surface of the diaphragm 240, so that, similar to the display device according to the fourth embodiment, it is possible to make the display unit 30 thin compared to a case where the display unit 30 is fixed (attached) to the other principal surface of the vibrators.

Sixth Embodiment

Next, a display device according to the sixth embodiment of the present invention will be described.

Figure 18:
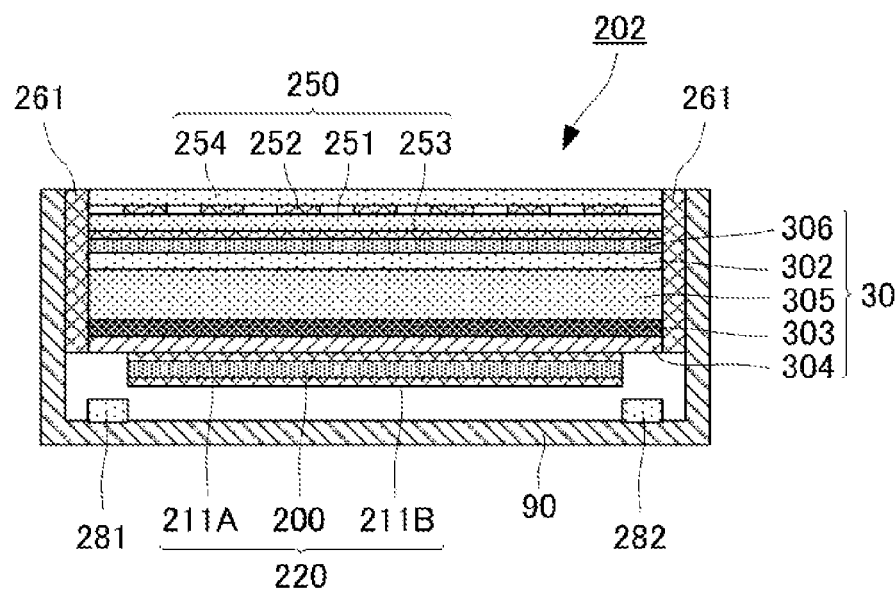
FIG. 18 is a sectional view of a display device 202 according to a sixth embodiment.

FIG. 18 is a sectional view of a display device 202 according to the sixth embodiment of the present invention.

The display device 202 according to the sixth embodiment differs from the above-described display device 201 in that the display device 202 does not include a diaphragm, and in a stacked structure of a touch panel 250, a display unit 30 and a vibrator 220. The other components are substantially the same and therefore will not be described.

In addition, in the present embodiment, the display unit 30 can be considered the "vibrating body", and the display device 202 can be considered the "vibrating device".

In the display device 202, the touch panel sensor 250, the display unit 30 and the vibrator 220 are stacked in this order.

The display unit 30 is a flat plate of a rectangular shape when seen from a plan view. As illustrated in FIG. 18, the display unit 30 includes a transparent electrode 306. The transparent electrode 306 forms the "conductor" according to the exemplary embodiment. Hence, part of the display unit 30 includes a planar conductor. The transparent electrode 306 of the display unit 30 is connected to a reference potential (e.g. 0 V which is a ground) of the touch panel sensor 250.

The vibrator 220 is a flat plate of a rectangular shape when seen from the plan view, and has a smaller area than that of the display unit 30. The vibrator 220 is pasted (in contact with) at an approximately center of the other principal surface (a lower surface in FIG. 18) of the display unit 30.

The touch panel sensor 250 is a flat plate of a rectangular shape as a planar shape, and is attached to one principal surface (an upper surface in FIG. 18) of the display unit 30.

As illustrated in FIG. 18, the touch panel sensor 250 of a flat shape and the display unit 30 are fitted to a housing 90 with a spacer 261 interposed therebetween to block an opening surface of the housing 90. More specifically, end surfaces at both sides of the touch panel sensor 250 and the display unit 30 are fixed to an inner wall near the opening of the housing 90 with the spacer 261 interposed therebetween.

In addition, the touch panel sensor 250 can be considered the "sensor" according to the exemplary embodiment.

As illustrated in FIG. 18, in the housing 90, the touch panel sensor 250, the display unit 30, the vibrator 220 and drive circuit modules 281 and 282 are disposed in this order from a side of an operation surface 91.

Next, an operation of the display device 202 according to the present embodiment will be described.

When the drive circuit modules 281 and 282 apply drive signals to the vibrator 220, and apply electric fields in a first direction to a piezoelectric body of the vibrator 220, the vibrator 220 contracts along a planar direction. The vibrator 220 is pasted on the other principal surface of the display unit 30, so that the other principal surface of the display unit 30 contracts accompanying contraction of the vibrator 220. Thus, the display unit 30 is curved and protruding forward (an upper direction in FIG. 18).

Meanwhile, when the drive circuit modules 281 and 282 apply drive signals to a piezoelectric body of the vibrator 220, and apply electric fields in a second direction opposite to the first direction, the vibrator 220 extends along the planar direction. The vibrator 220 is pasted on the other principal surface of the display unit 30, so that the other principal surface of the display unit 30 extends accompanying extension of the vibrator 220. Thus, the display unit 30 is curved and protruding backward (a lower direction in FIG. 18).

Hence, the display unit 30 vibrates along a front surface direction and a back surface direction (a direction orthogonal to the principal surface of the display unit 30) based on a state in FIG. 18 according to an amplitude of a drive signal. Thus, the vibration corresponding to the drive signal is transmitted to the touch panel sensor 50 via the display unit 30, and is fed back to the user who has touched the touch panel sensor 50.

Consequently, when the user touches each touch sensor 80 of the touch panel sensor 50, an operation surface vibrates, so that the user can feel the "push" of the key.

In this regard, the drive circuit module 282 which applies the drive signal causes electromagnetic noise. However, the transparent electrode 306 which is the conductor is arranged between the touch panel sensor 250 and the drive circuit module 282, and the transparent electrode 306 is connected to a reference potential of the touch panel sensor 250.

Further, a principal surface of the transparent electrode 306 has a substantially equal size to the principal surface of the touch panel sensor 250, and the transparent electrode 306 overlaps and covers the touch panel sensor 250 when seen from the plan view. That is, the transparent electrode 306 is sandwiched between the touch panel sensor 250 and the drive circuit modules 281 and 282, and the transparent electrode 306 is positioned between the touch panel sensor 250 and the drive circuit modules 281 and 282 at all times. Consequently, the transparent electrode 306 functions as a shielding plate, and can reliably shield electromagnetic noise caused by the drive circuit module 282. Further, by using the transparent electrode 306 as the shielding plate, it is not necessary to perform an operation of adding a new part for shielding noise caused by the drive circuit module 282.

Consequently, the display device 202 according to the present embodiment can reliably prevent an error operation of the touch panel sensor 250 similar to the display device 201 described above.

Seventh Embodiment

Next, a display device according to the seventh embodiment of the present invention will be described.

Figure 19:
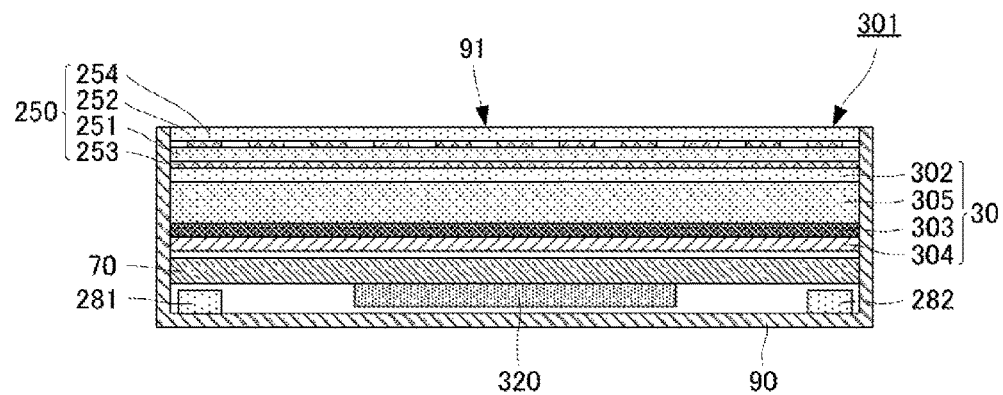
FIG. 19 is a sectional view of a display device 301 according to a seventh embodiment.
Figure 20:
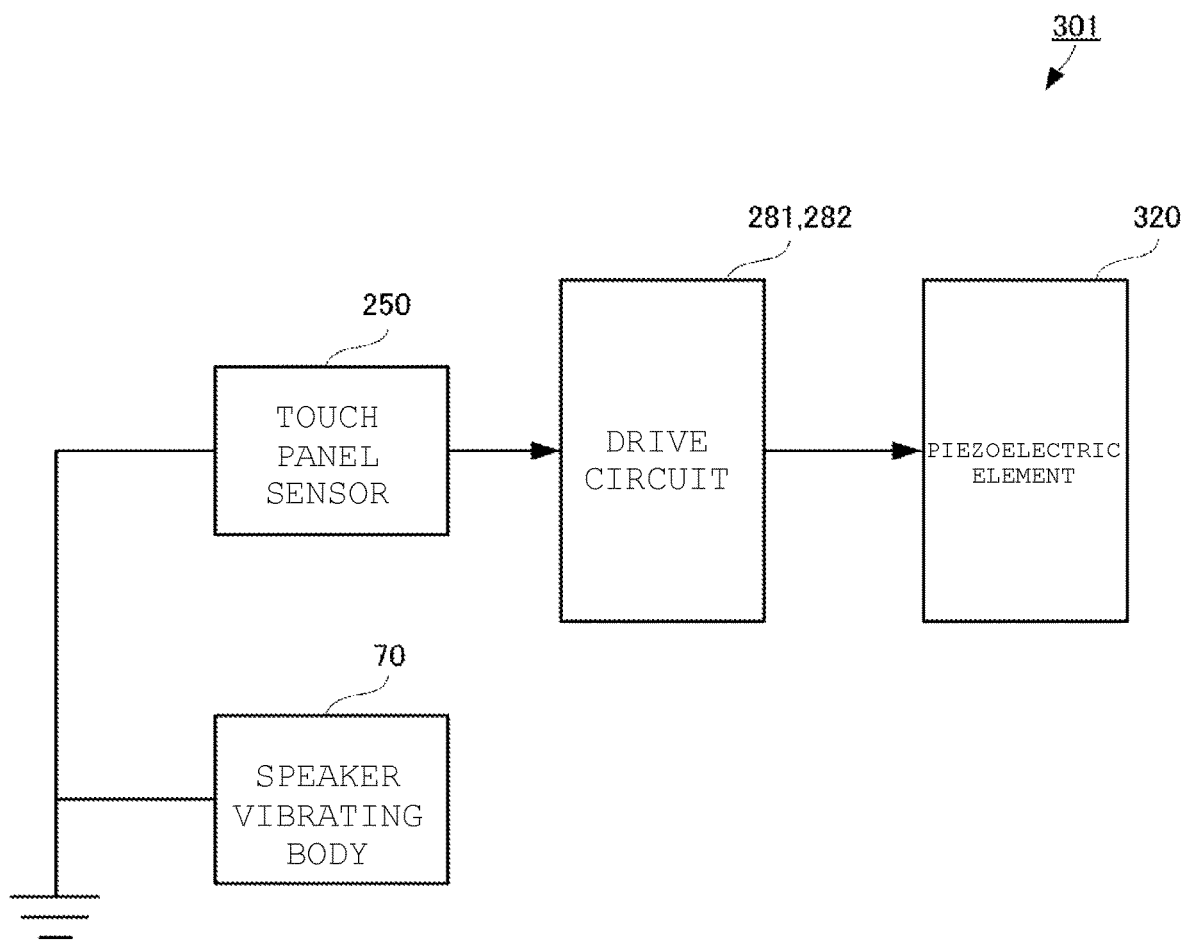
FIG. 20 is a block diagram illustrating a configuration of the display device 301 illustrated in FIG. 19.

FIG. 19 is a sectional view of a display device 301 according to the seventh embodiment of the present invention. FIG. 20 is a block diagram illustrating a configuration of the display device 301 illustrated in FIG. 19.

The display device 301 differs from an above-described display device 201 in that a touch panel sensor 250 and a display unit 30 are adhered and the display device 301 includes a piezoelectric element 320 and a speaker vibrating body 70. The other components are the same and therefore will not be described.

In addition, in the present embodiment, the piezoelectric element 320 forms the "vibrator" and the speaker vibrating body 70 forms the "vibrating body" according to the exemplary embodiment.

The speaker vibrating body 70 is a conductor composed of a metal plate of a flat shape, for example.

In the present embodiment, the speaker vibrating body 70 is the "vibrating body" and further forms the "conductor".

The speaker vibrating body 70 is connected to a reference potential (e.g. 0 V which is a ground) of the touch panel sensor 250. Further, as illustrated in FIG. 19, a principal surface of the speaker vibrating body 70 has a substantially equal size to a principal surface of the touch panel sensor 250, and the speaker vibrating body 70 overlaps and covers the touch panel sensor 250 when seen from a plan view. That is, the entire touch panel sensor 250 overlaps the speaker vibrating body 70 when seen from the plan view.

The piezoelectric element 320 is composed of piezoelectric ceramics which is polarized in a thickness direction of the piezoelectric element 320, and electrodes which are formed on both principal surfaces of the piezoelectric ceramics. The piezoelectric element 320 has a d33 piezoelectric constant. The piezoelectric element 320 is pasted to (in contact with) a principal surface at an opposite side to an operation surface 91 of the speaker vibrating body 70.

In addition, in the present embodiment, although the piezoelectric element 320 is composed of the piezoelectric ceramics, the piezoelectric element may be actually composed of a vibrator (piezoelectric film).

According to the above configuration, when a user touches the operation surface 91 of the touch panel sensor 250, a drive circuit module 282 applies a drive signal to the electrodes of the piezoelectric element 320. Thus, the piezoelectric element 320 extends and contracts in the thickness direction. Hence, the speaker vibrating body 70 vibrates in response to extension and contraction of the piezoelectric element 320, and emits a touch sound, for example.

Consequently, when the user touches the operation surface 91 of the touch panel sensor 250, for example, a touch sound is emitted, so that the user can feel the "push" of the key.

In this regard, the drive circuit module 282 which applies the drive signal causes electromagnetic noise. However, the speaker vibrating body 70 which is the conductor is arranged between the touch panel sensor 250 and the drive circuit module 282, and is connected to a reference potential of the touch panel sensor 250.

Further, the entire touch panel sensor 250 overlaps the speaker vibrating body 70 when seen from the plan view. Hence, the speaker vibrating body 70 is sandwiched between the touch panel sensor 250 and the drive circuit modules 281 and 282, and the speaker vibrating body 70 is positioned between the touch panel sensor 250 and the drive circuit modules 281 and 282 at all times. Consequently, the speaker vibrating body 70 functions as a shielding plate, and can reliably shield electromagnetic noise caused by the drive circuit module 282. Further, by using the speaker diaphragm 70 as the shielding plate, it is not necessary to perform an operation of adding a new part for shielding noise caused by the drive circuit module 282.

Consequently, the display device 301 according to the present embodiment can reliably prevent an error operation of the touch panel sensor 250 similar to a vibrating device 101.

Eighth Embodiment

Next, a display device according to the eighth embodiment of the present invention will be described.

Figure 21:
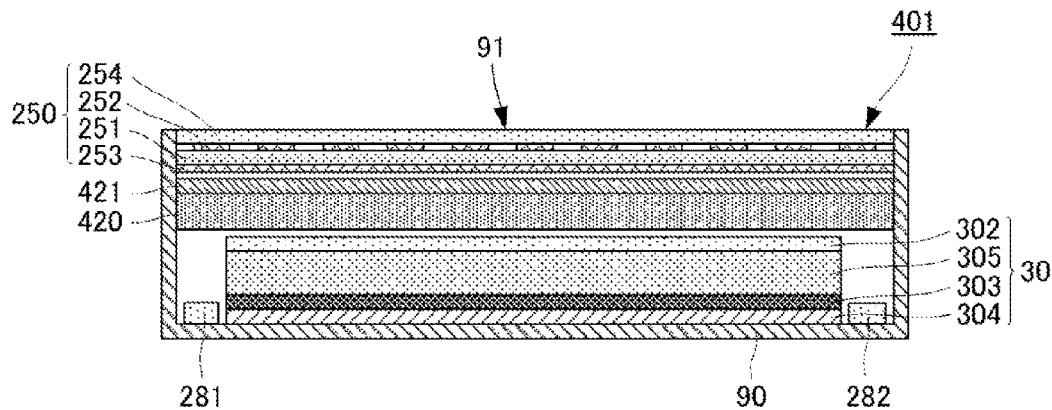
FIG. 21 is a sectional view of a display device 401 according to an eighth embodiment.
Figure 22:
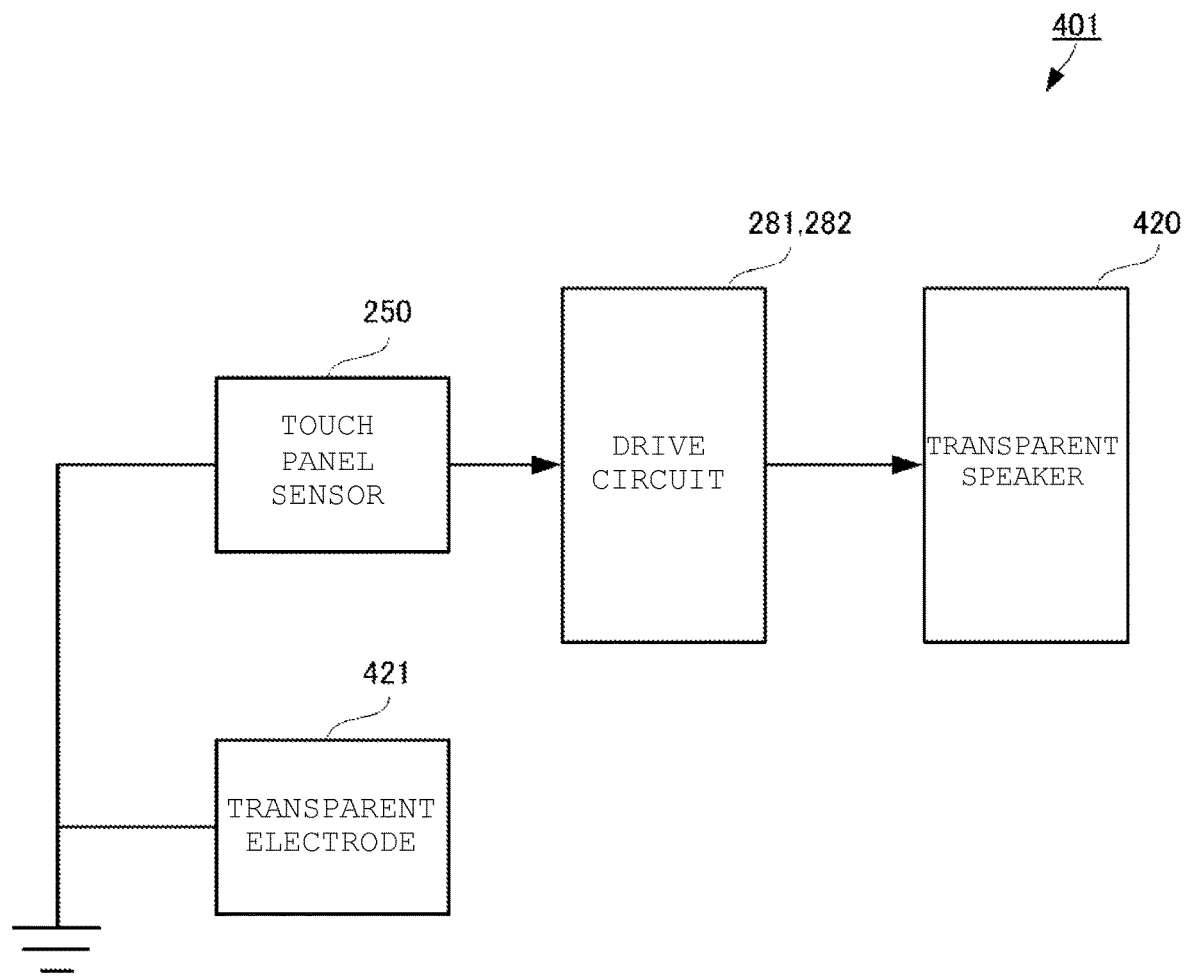
FIG. 22 is a block diagram illustrating a configuration of the display device 401 illustrated in FIG. 21.

FIG. 21 is a sectional view of a display device 401 according to the eighth embodiment of the present invention. FIG. 22 is a block diagram illustrating a configuration of the display device 401 illustrated in FIG. 21.

The display device 401 differs from the above-described display device 201 in that the display device 401 includes a transparent speaker 420 and a transparent electrode 421. The other components are the same and therefore will not be described.

In addition, in the present embodiment, the transparent electrode 421 forms the "conductor". Further, in the present embodiment, the transparent speaker 420 and the transparent electrode 421 collectively form the "vibrating body".

The transparent electrode 421 which is the conductor is provided on a principal surface of the transparent speaker 420 at a side of an operation surface 91. The transparent speaker 420 is composed of, for example, an acrylic plate (diaphragm) and a piezoelectric film (vibrator) which is pasted on a principal surface of the acrylic plate at an opposite side to the operation surface 91.

Further, the transparent electrode 421 of the transparent speaker 420 is connected to a reference potential (e.g. 0 V which is a ground) of a touch panel sensor 250. Furthermore, as illustrated in FIG. 21, principal surfaces of the transparent speaker 420 and the transparent electrode 421 have substantially equal sizes to a principal surface of the touch panel sensor 250, and the transparent speaker 420 and the transparent electrode 421 overlap and cover the touch panel sensor 250 when seen from a plan view. That is, the entire touch panel sensor 250 overlaps the transparent electrode 421 when seen from the plan view.

According to the above configuration, when a user touches the operation surface 91 of the touch panel sensor 250, a drive circuit module 282 applies a drive signal to the transparent speaker 420. Thus, the transparent speaker 420 vibrates and emits a touch sound, for example.

Consequently, when the user touches the operation surface 91 of the touch panel sensor 250, for example, a touch sound is emitted, so that the user can feel the "push" of the key.

In this regard, the drive circuit module 282 which applies the drive signal causes electromagnetic noise. However, the transparent electrode 421 is arranged between the touch panel sensor 250 and the drive circuit module 282, and is connected to the reference potential of the touch panel sensor 250.

Further, the entire touch panel sensor 250 overlaps the transparent electrode 421 when seen from the plan view. Hence, the transparent speaker 420 and the transparent electrode 421 are sandwiched between the touch panel sensor 250 and the drive circuit modules 281 and 282, and the transparent speaker 420 and the transparent electrode 421 are positioned between the touch panel sensor 250 and the drive circuit modules 281 and 282 at all times.

Consequently, the transparent electrode 421 functions as a shielding plate, and can reliably shield electromagnetic noise caused by the drive circuit module 282. Further, by using the transparent electrode 421 as the shielding plate, it is not necessary to perform an operation of adding a new part for shielding noise caused by the drive circuit module 282.

Furthermore, the transparent electrode 421 is arranged between the display unit 30 which is a display, and the touch panel sensor 250. Hence, the transparent electrode 421 shields the electromagnetic noise caused by the display unit 30, too.

Consequently, the display device 401 according to the present embodiment can prevent electromagnetic noise caused by both of the display unit 30 and the drive circuit module 282 from causing an error operation of a touch sensor 80.

Ninth Embodiment

Next, a display device according to the ninth embodiment of the present invention will be described.

Figure 23:
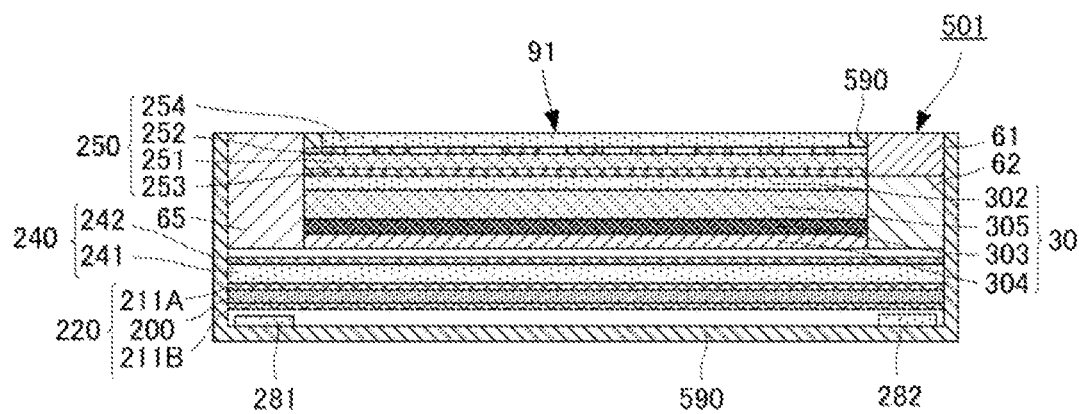
FIG. 23 is a sectional view of a display device 501 according to a ninth embodiment.
Figure 24:
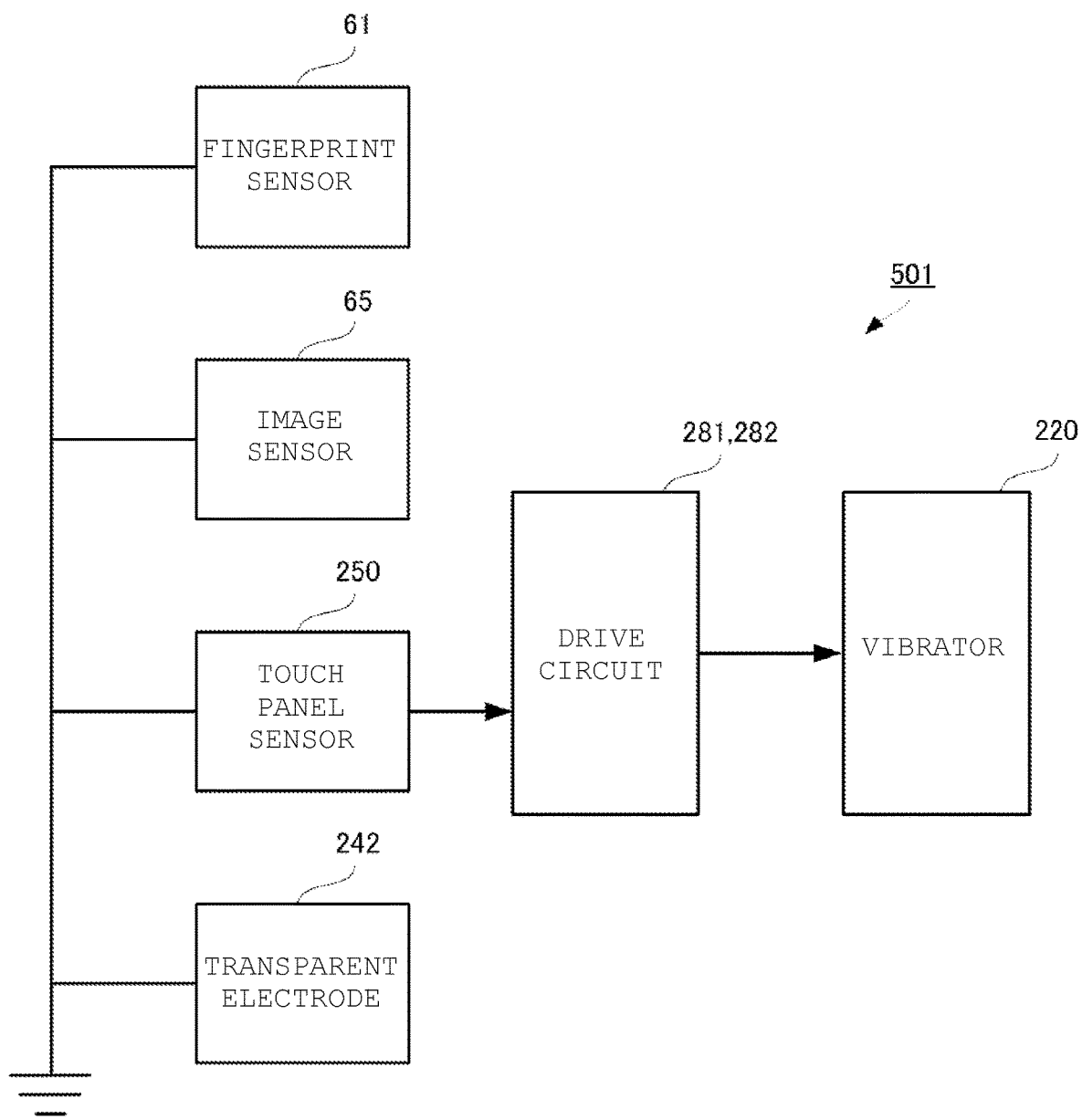
FIG. 24 is a block diagram illustrating a configuration of the display device 501 illustrated in FIG. 23.

FIG. 23 is a sectional view of a display device 501 according to the ninth embodiment of the present invention. FIG. 24 is a block diagram illustrating a configuration of the display device 501 illustrated in FIG. 23.

The display device 501 differs from the above-described display device 201 in a stacking order of a touch panel sensor 250, a display unit 30, a diaphragm 240 and a vibrator 220, and in that the display device 501 includes a housing 590, a lens which is not illustrated, a fingerprint sensor 61, a home button 62 and an image sensor 65. The other components are the same and therefore will not be described.

In addition, in the present embodiment, the touch panel sensor 250, the fingerprint sensor 61 and the image sensor 65 collectively can be considered the "sensors" according to the exemplary embodiment. In addition, the diaphragm 240 forms the "vibrating body" according to the exemplary embodiment.

In the display device 501, the touch panel sensor 250, the display unit 30, the diaphragm 240 and the vibrator 220 are stacked in this order.

Further, the fingerprint sensor 61 is attached to the home button 62, and is mounted in the home button 62. The fingerprint sensor 61 reads a user's fingerprint pattern. The image sensor 65 converts light entering from the lens which the display device 501 has and which is not illustrated, into an electrical signal.

The diaphragm 240 is composed of a transparent plate 241 and a transparent electrode 242.

The transparent electrode 242 forms the "conductor" according to the exemplary embodiment. Hence, part of the diaphragm 240 includes a planar conductor. The transparent electrode 242 of the diaphragm 240 is connected to a reference potential (e.g. 0 V which is a ground) of the touch panel sensor 250.

The housing 590 is provided between a protection film 254 of the touch panel sensor 250 and the fingerprint sensor 61 and between the protection film 254 of the touch panel sensor 250 and the image sensor 65 to partition therebetween. The other configuration of the housing 590 is the same as that of a housing 90 and therefore will not be described.

According to the above configuration, when the user touches an operation surface 91 of the touch panel sensor 250, a drive circuit module 282 applies a drive signal to an electrode 211A and an electrode 211B of the vibrator 220. Thus, the vibrator 220 extends and contracts.

Consequently, when the user touches the operation surface 91 of the touch panel sensor 250, the operation surface 91 vibrates, so that the user can feel the "push" of the key.

In this regard, the drive circuit module 282 which applies the drive signal causes electromagnetic noise. However, the transparent electrode 242 which is the conductor is arranged between the touch panel sensor 250, the fingerprint sensor 61, the image sensor 65 and the drive circuit module 282, and is connected to a reference potential of the touch panel sensor 250.

Further, a principal surface of the transparent electrode 242 has a substantially equal size to principal surfaces of the touch panel sensor 250, the fingerprint sensor 61 and the image sensor 65, and the transparent electrode 242 overlaps and covers the touch panel sensor 250, the fingerprint sensor 61 and the image sensor 65 when seen from a plan view. That is, the entirety of the touch panel sensor 250, the fingerprint sensor 61 and the image sensor 65 (sensor) overlaps the transparent electrode 242 when seen from a plan view. Hence, the transparent electrode 242 is positioned between the touch panel sensor 250, the fingerprint sensor 61 and the image sensor 65 at all times.

Consequently, the transparent electrode 242 functions as a shielding plate and reliably shields electromagnetic noise caused by the drive circuit module 282. Further, by using the transparent electrode 242 as the shielding plate, it is not necessary to perform an operation of adding a new part for shielding noise caused by the drive circuit module 282.

Consequently, similar to a vibrating device 101, the display device 501 according to the present embodiment can prevent electromagnetic noise caused by the drive circuit module 282 from causing error operations of the touch panel sensor 250, the fingerprint sensor 61 and the image sensor 65.

Tenth Embodiment

Next, a display device according to the tenth embodiment of the present invention will be described.

Figure 25:
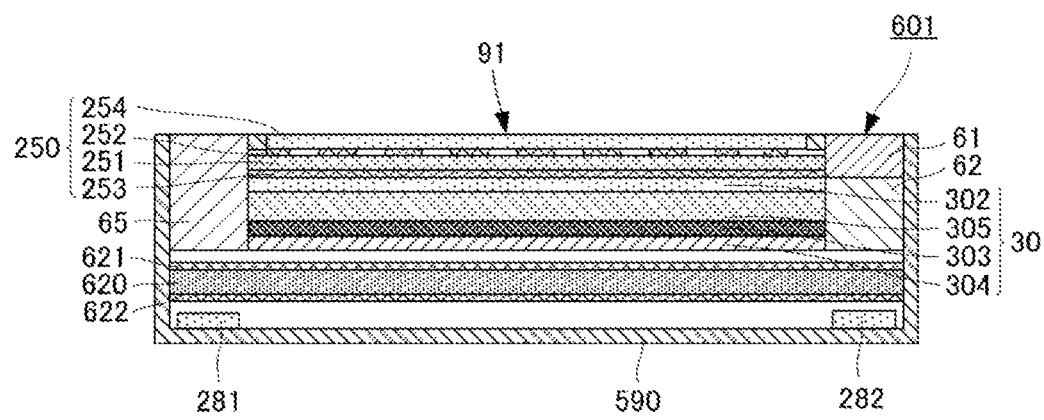
FIG. 25 is a sectional view of a display device 601 according to a tenth embodiment.
Figure 26:
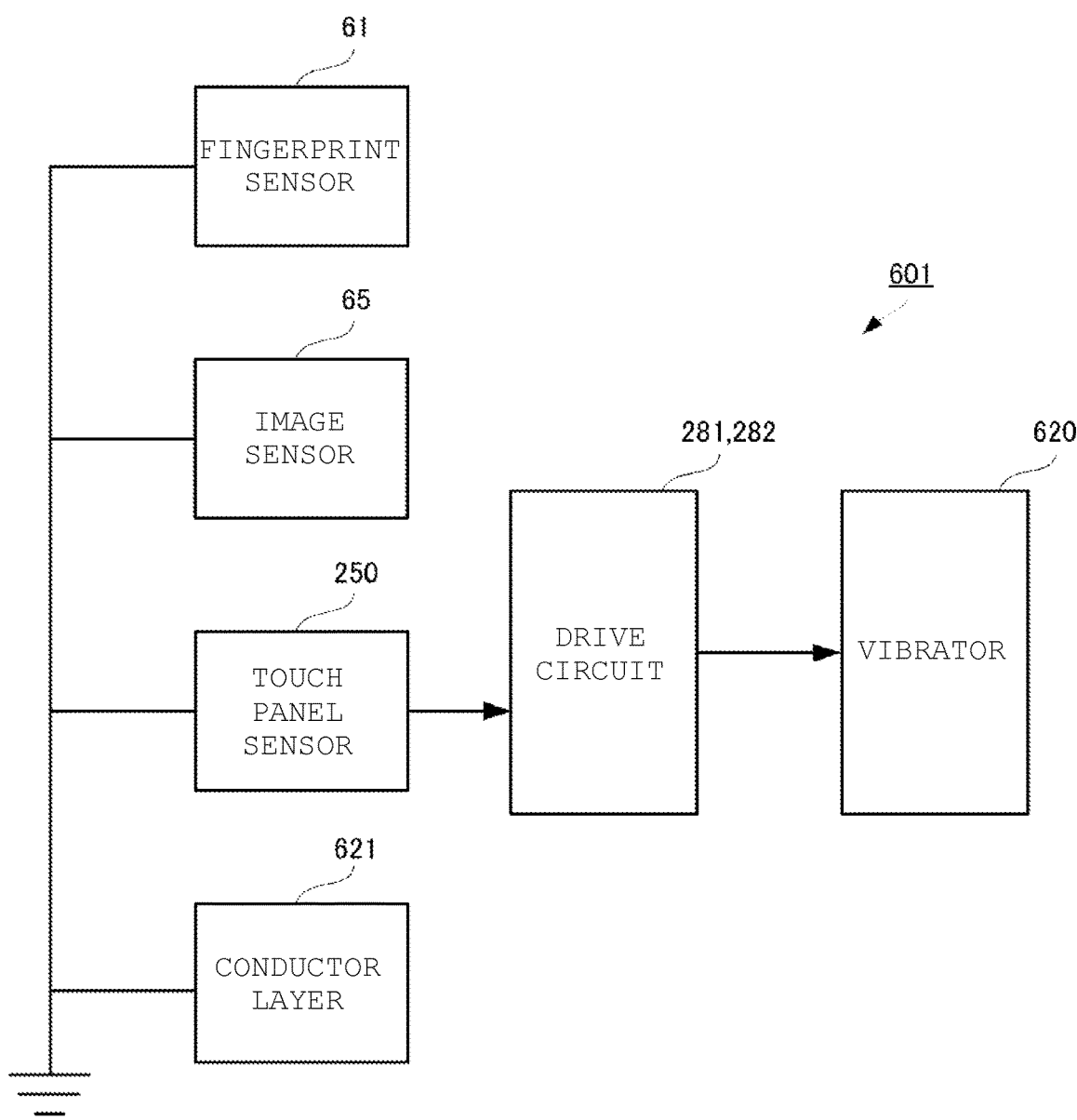
FIG. 26 is a block diagram illustrating a configuration of the display device 601 illustrated in FIG. 25.

FIG. 25 is a sectional view of a display device 601 according to the tenth embodiment of the present invention. FIG. 26 is a block diagram illustrating a configuration of the display device 601 illustrated in FIG. 25.

The display device 601 differs from the above-described display device 501 in that the display device 601 does not include a diaphragm 240 and in that the display device 601 includes a vibrator 620 instead of a vibrator 220. The other components are the same and therefore will not be described.

The vibrator 620 is composed of, for example, a piezoelectric film having a higher piezoelectric constant than that of the vibrator 220. The vibrator 620 includes conductor layers 621 and 622. The conductor layers 621 and 622 are, for example, surface conductor layers formed on both principal surfaces of the vibrator 620. Hence, part of the vibrator 620 includes a planar conductor. The conductor layer 621 of the vibrator 620 is connected to a reference potential (e.g. 0 V which is a ground) of a touch panel sensor 250.

The conductor layer 621 forms the "conductor" according to the exemplary embodiment. In addition, the conductor layer 622 can also be composed as the "conductor" according to the exemplary embodiment.

According to the above configuration, when a user touches an operation surface 91 of the touch panel sensor 250, a drive circuit module 282 applies a drive signal to the vibrator 620. Thus, the vibrator 620 extends and contracts, and vibrates.

Consequently, when the user touches the operation surface 91 of the touch panel sensor 250, the operation surface 91 vibrates, so that the user can feel the "push" of the key.

In this regard, the drive circuit module 282 which applies the drive signal causes electromagnetic noise. However, the conductor layer 621 which is the conductor is arranged between the touch panel sensor 250, a fingerprint sensor 61, an image sensor 65 and the drive circuit module 282, and is connected to the reference potential of the touch panel sensor 250.

Further, a principal surface of the conductor layer 621 has a substantially equal size to principal surfaces of the touch panel sensor 250, the fingerprint sensor 61 and the image sensor 65, and the conductor layer 621 overlaps and covers the touch panel sensor 250, the fingerprint sensor 61 and the image sensor 65 when seen from a plan view. That is, the entirety of the touch panel sensor 250, the fingerprint sensor 61 and the image sensor 65 (sensor) overlaps the conductor layer 621 when seen from the plan view. Hence, the conductor layer 621 is positioned between the touch panel sensor 250, the fingerprint sensor 61 and the image sensor 65 at all times.

Consequently, the conductor layer 621 functions as a shielding plate and reliably shields electromagnetic noise caused by the drive circuit module 282. Further, by using the conductor layer 621 as the shielding plate, it is not necessary to perform an operation of adding a new part for shielding noise caused by the drive circuit module 282.

Consequently, similar to a vibrating device 101, the display device 601 according to the present embodiment can prevent electromagnetic noise caused by the drive circuit module 282 from causing error operations of the touch panel sensor 250, the fingerprint sensor 61 and the image sensor 65.

In addition, in each of the embodiments, although drive circuit modules 281 and 282 are disposed at positions illustrated in FIGS. 11, 18, 19, 21, 23 and 25 in a housing 90, each embodiment is not limited to this. When each embodiment is carried out, for example, the drive circuit module 281 may be disposed at an arbitrary position.

In addition, in each of the embodiments, the vibrators are not limited to the piezoelectric film and piezoelectric ceramics. For example, an electrostriction film, an electret film, a composite film, an electroactive film or the like can be used for the vibrators. The electroactive film refers to a film which is electrically driven to produce a stress or a film which is electrically driven to deform and cause a displacement. More specifically, the electroactive film includes a composite material (a material formed by sealing piezoelectric ceramics with resin), an electric drive elastomer or a liquid crystal elastomer.

Lastly, it should be understood that explanation of each of the embodiments is exemplary in all aspects and is non-restrictive. The scope of the present invention is expressed by the claims not by the above embodiments. Further, the scope of the present invention intends to include all changes having meanings and a scope equivalent to the claims.

DESCRIPTION OF REFERENCE SYMBOLS 20, 21: VIBRATOR
30: DISPLAY UNIT
40: DIAPHRAGM
50: TOUCH PANEL SENSOR
60: ADHESIVE LAYER
61: FINGERPRINT SENSOR
62: HOME BUTTON
65: IMAGE SENSOR
70: SPEAKER VIBRATING BODY
80: TOUCH SENSOR
81: DRIVE CIRCUIT
82: PRINTED CIRCUIT BOARD
90: HOUSING
91: OPERATION SURFACE
100, 100A: HOLLOW AREA
101: VIBRATING DEVICE
200: BASE FILM
201, 202: DISPLAY DEVICE
211A, 211B: ELECTRODE
220: VIBRATOR
240: DIAPHRAGM
241: TRANSPARENT PLATE
242: TRANSPARENT ELECTRODE
250: TOUCH PANEL SENSOR
251: INSULATION SUBSTRATE
252, 253: CAPACITANCE DETECTION ELECTRODE
254: PROTECTION FILM
281, 282: DRIVE CIRCUIT MODULE
301: DISPLAY DEVICE
302: TOP SURFACE POLARIZING PLATE
303: BACK SURFACE POLARIZING PLATE
304: BACKLIGHT
305: LIQUID CRYSTAL PANEL
306: TRANSPARENT ELECTRODE
320: PIEZOELECTRIC ELEMENT
401: DISPLAY DEVICE
420: TRANSPARENT SPEAKER
421: TRANSPARENT ELECTRODE
501: DISPLAY DEVICE
590: HOUSING
601: DISPLAY DEVICE
620: VIBRATOR
621, 622: CONDUCTOR LAYER

The invention claimed is:

1. A vibrating device comprising:
a touch sensor;
a pair of vibrators configured to vibrate in response to a drive signal;
a drive circuit configured to generate the drive signal; and
a vibrating body disposed between the pair of vibrators and the touch sensor and including a conductor that is connected to a reference potential configured as a ground for the touch sensor,
wherein the vibrating body is convexly curved with the pair of vibrators coupled to respective ends of the vibrating body to define a space between the vibrating body and the pair of vibrators and with the drive circuit positioned between the pair of vibrators, and
wherein the conductor is disposed between the touch sensor and the drive circuit, such that the conductor is configured to shield the touch sensor from electromagnetic noise caused by the drive circuit.

2. The vibrating device according to claim 1, wherein the drive circuit is configured to generate the drive signal when the touch sensor detects a touch operation.

3. The vibrating device according to claim 2, wherein the vibrating body is convexly curved to produce bending stress of the vibrating body.

4. The vibrating device according to claim 3, wherein the vibrating body is curved in a direction orthogonal to a principal surface of the pair of vibrators.

5. The vibrating device according to claim 2, wherein the vibrating body has a surface that is flat when the vibrating body is fixed to the pair of vibrators.

6. The vibrating device according to claim 1, wherein the pair of vibrators are a chiral polymer.

7. The vibrating device according to claim 6, wherein the chiral polymer is polylactic acid.

8. The vibrating device according to claim 7, wherein the polylactic acid is poly-L-lactic acid.

9. The vibrating device according to claim 1, wherein the touch sensor is disposed directly on the conductor.

10. The vibrating device according to claim 1, wherein the touch sensor, the vibrating body and the pair of vibrators stacked with the vibrating body disposed between the touch sensor and the pair of vibrators.

11. The vibrating device according to claim 1, further comprising a touch panel that includes the touch sensor and that is attached to the vibrating body.

12. The vibrating device according to claim 1, wherein the conductor has a larger surface area than the touch sensor such that the conductor completely overlaps the touch sensor.

13. The vibrating device according to claim 1, wherein the vibrating body only includes the conductor.

14. A vibrating device comprising:
a touch sensor;
a pair of vibrators configured to vibrate in response to a drive signal;
a drive circuit configured to generate the drive signal; and
a vibrating body at least partially coupled to the pair of vibrators with a space defined between the vibrating body and the pair of vibrators, wherein the vibrating body includes a conductor that is connected to a reference potential of the touch sensor, and that is disposed between the touch sensor and the drive circuit, and wherein the vibrating body is convexly curved with the pair of vibrators coupled to respective ends of the vibrating body to define the space therebetween with the drive circuit positioned between the pair of vibrators.

15. The vibrating device according to claim 14, wherein the drive circuit is configured to generate the drive signal when the touch sensor detects a touch operation.

16. The vibrating device according to claim 15, wherein the vibrating body is convexly curved to produce bending stress of the vibrating body, and the vibrating body is curved in a direction orthogonal to a principal surface of the pair of vibrators.

* * * * *